US008538017B2

(12) United States Patent
Endo et al.

(10) Patent No.: US 8,538,017 B2
(45) Date of Patent: Sep. 17, 2013

(54) ENCRYPTION DEVICE

(75) Inventors: Tsukasa Endo, Tokyo (JP); Hideo Shimizu, Tokyo (JP); Yuichi Komano, Kanagawa (JP); Hanae Ikeda, Tokyo (JP); Atsushi Shimbo, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 97 days.

(21) Appl. No.: 13/192,122

(22) Filed: Jul. 27, 2011

(65) Prior Publication Data
US 2012/0069998 A1    Mar. 22, 2012

(30) Foreign Application Priority Data
Sep. 17, 2010   (JP) ................................. 2010-209617

(51) Int. Cl.
*H04L 9/00*   (2006.01)

(52) U.S. Cl.
USPC ................................ 380/46; 380/44; 380/277

(58) Field of Classification Search
None
See application file for complete search history.

(56) References Cited

U.S. PATENT DOCUMENTS

| 6,658,569 | B1 | 12/2003 | Patarin et al. | |
|---|---|---|---|---|
| 7,194,328 | B1 * | 3/2007 | Haskins et al. | 700/174 |
| 8,190,425 | B2 * | 5/2012 | Mehrotra et al. | 704/203 |
| 2003/0048903 | A1 * | 3/2003 | Ito et al. | 380/263 |
| 2007/0140478 | A1 | 6/2007 | Komano et al. | |

OTHER PUBLICATIONS

Cryptographic Hardware and Embedded Systems CHES 2001; Third InternationalWorkshop Paris, France, May 14-16, 2001 Proceedings; year 2001.*
Introduction to Differential Power Analysis and Related Attacks; Kocher et al.; year 1998.*
Herbst et al.; "An AES Smart Card Implementation Resistant to Power Analysis Attacks", ACNS, LNCS, vol. 3989, Springer-Verlag, pp. 239-252, (2006).
Goubin et al.; "DES and Differential Power Analysis—The 'Duplication' Method", CHES, LNCS, vol. 1717, Springer-Verlag, pp. 158-172, (1999).

* cited by examiner

*Primary Examiner* — David Y Jung
(74) *Attorney, Agent, or Firm* — Finnegan, Henderson, Farabow, Garrett & Dunner, L.L.P.

(57) ABSTRACT

According to one embodiment, in an encryption device, a segmentation unit segments masked plain data into pieces of first segmented data. A first processing unit generates pieces of second segmented data from the pieces of first segmented data. A nonlinear transform unit generates pieces of third segmented data transformed from the pieces of second segmented data. A data integration unit integrates fourth segmented data to generate masked encrypted data. An unmask processing unit generates encrypted data from the masked encrypted data. The exclusive OR of the pieces of second segmented data matches the exclusive OR of input data, subjected to nonlinear transform processing and calculated from the plain data, and the first mask. The exclusive OR of the pieces of third segmented data matches the exclusive OR of transform data, obtained when the nonlinear transform processing is performed on the input data, and the second mask.

4 Claims, 14 Drawing Sheets

US 8,538,017 B2

ENCRYPTION DEVICE

CROSS-REFERENCE TO RELATED APPLICATIONS

This application is based upon and claims the benefit of priority from Japanese Patent Application No. 2010-209617, filed on Sep. 17, 2010; the entire contents of which are incorporated herein by reference.

FIELD

Embodiments described herein relate generally to an encryption device which performs encryption processing including nonlinear transform processing.

BACKGROUND

Various side channel attacks have been contrived. Such attacks use physical information of an operating encryption module including processing time, power consumption, and electromagnetic waves. There are analysis methods that use the power consumption information such as simple power analysis (SPA), differential power analysis (DPA), and correlation power analysis (CPA). The DPA is an attack method which statistically analyzes power consumption during the encryption processing to extract internal information. As the countermeasure against the DPA or CPA, a mask method is known.

In the mask method, a random number or a fixed value called a mask is added to data under encryption processing and the encryption processing is continued, thereby eliminating the correlation between power consumption and data under encryption processing. However, if secondary DPA or higher-order DPA which is extended from the secondary DPA is used, the encryption key can also be analyzed from an encryption circuit to which the mask method is applied. The secondary DPA is an attack method which determines the presence/absence of the correlation between power consumption and data under encryption processing in consideration of the effect of the mask using power at two points on the power consumption waveform. With regard to the two points on the power consumption waveform, for example, use is made of power consumption at a point at which masked data for intermediate data of the encryption processing is processed and power consumption at a point at which masked data is processed, or use is made of power consumption at points at which two pieces of data with the same mask are processed. As the countermeasure against the DPA or CPA, a duplication method is known. The duplication method is a method which segments data under encryption processing into two pieces of data, thereby eliminating the correlation between power consumption and data under encryption processing.

The duplication method is vulnerable to the secondary DPA.

DETAILED DESCRIPTION

In general, according to one embodiment, in an encryption device, a mask processing unit generates masked plain data from the plain data. A segmentation unit segments masked plain data into pieces of first segmented data. A first processing unit generates pieces of input segmented data from the pieces of first segmented data. A receiving unit receives the pieces of input segmented data, a first mask, and a second mask. A nonlinear transform unit generates pieces of output segmented data transformed from the pieces of input segmented data. A data integration unit integrates second segmented data to generate masked encrypted data. An unmask processing unit generates encrypted data from the masked encrypted data. The exclusive OR of the pieces of input segmented data matches the exclusive OR of input data, subjected to nonlinear transform processing and calculated from the plain data, and the first mask. The exclusive OR of the pieces of output segmented data matches the exclusive OR of transform data, obtained when the nonlinear transform processing is performed on the input data, and the second mask.

Hereinafter, embodiments of an encryption device will be described in detail with reference to the accompanying drawings.

In the following, an example will be described in which an encryption device uses an Advanced Encryption Standard (AES) scheme with a key length of 128 bits. However, an embodiment may also be applied to an encryption device which uses an AES scheme with a key length of 196 bits or 256 bits. An embodiment may also be applied to a device which processes an encryption algorithm using another nonlinear transform, such as Data Encryption Standard (DES) or Hierocrypt. An embodiment may also be applied to a hash function using nonlinear transform.

Figure 1:
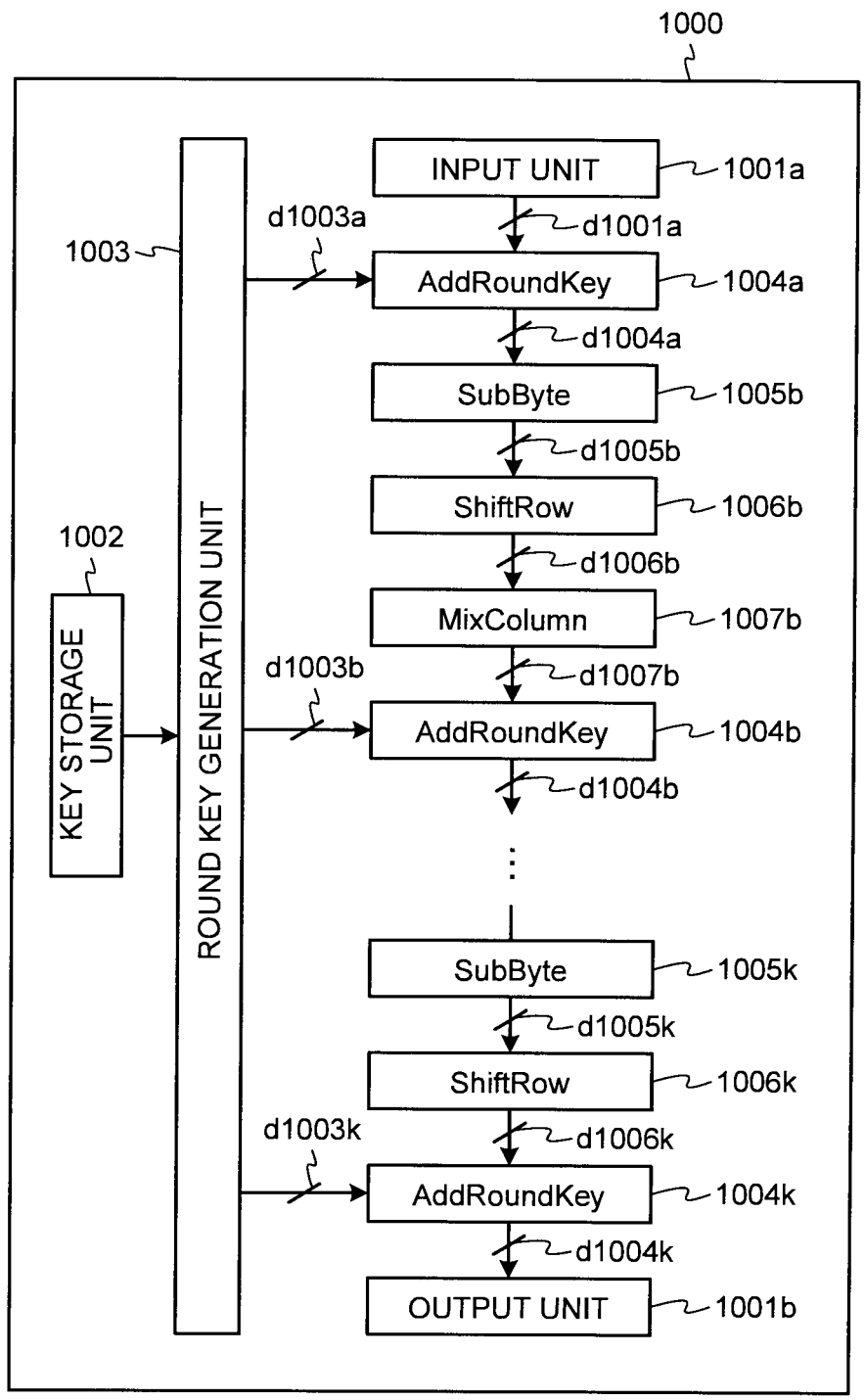
FIG. 1 is a block diagram showing a configuration example of an encryption device.

Here, configuration examples of an encryption device and a decryption device using an AES scheme will be described. FIG. 1 is a block diagram showing an example of the configuration of an encryption device 1000. As shown in FIG. 1, the encryption device 1000 includes an input unit 1001a, an output unit 1001b, a key storage unit 1002, a round key generation unit 1003, AddRoundKey 1004a to 1004k, SubByte 1005b to 1005k, ShiftRow 1006b to 1006k, and MixColumn 1007b to 1007j.

The input unit 1001a receives an input of plain data from the outside. The output unit 1001b outputs encrypted data of a processing result to the outside. An input/output unit 1001 having the functions of the input unit 1001a and the output unit 1001b may be provided.

The key storage unit 1002 stores a 128-bit secret key. The key storage unit 1002 can be formed by a generally used storage medium, such as a Hard Disk Drive (HDD), an optical disk, a memory card, or a Random Access Memory (RAM).

The round key generation unit 1003 calculates eleven keys, which are 128-bit round keys d1003a to d1003k, from the secret key stored in the key storage unit 1002, and supplies the round keys d1003a to d1003k to the AddRoundKey 1004a to 1004k. The round keys d1003a to d1003k may be calculated before the AddRoundKey 1004a is executed or may be calculated in parallel with the execution of the AddRoundKey 1004a to 1004k.

Data d1001a which is input to the AddRoundKey 1004a is the same as input plain data. The AddRoundKey 1004a to 1004k perform AddRoundKey transform processing, which is defined by AES encryption, on data d1001a, d1007b to d1007j, and d1006k, and output data d1004a to d1004k. Data d1004a to d1004j are input to the SubByte 1005b to 1005j. Data d1004k is the same as encrypted data.

The SubByte 1005b to 1005k nonlinearly transform data d1004a to d1004j for every eight bits, and output data d1005b to d1005k. Data d1005b to d1005k are input to the ShiftRow 1006b to 1006k.

The ShiftRow 1006b to 1006k rearrange data d1005b to d1005k in units of eight-bit blocks, and output data d1006b to d1006k. Data d1006b to d1006j are input to the MixColumn 1007b to 1007j. Data d1006k is input to the AddRoundKey 1004k.

The MixColumn 1007b to 1007j linearly transform data d1007b to d1007j for every 32 bits, and output data d1007b to d1007j. Data d1007b to d1007j are input to the AddRoundKey 1004b to 1004j.

Figure 2:
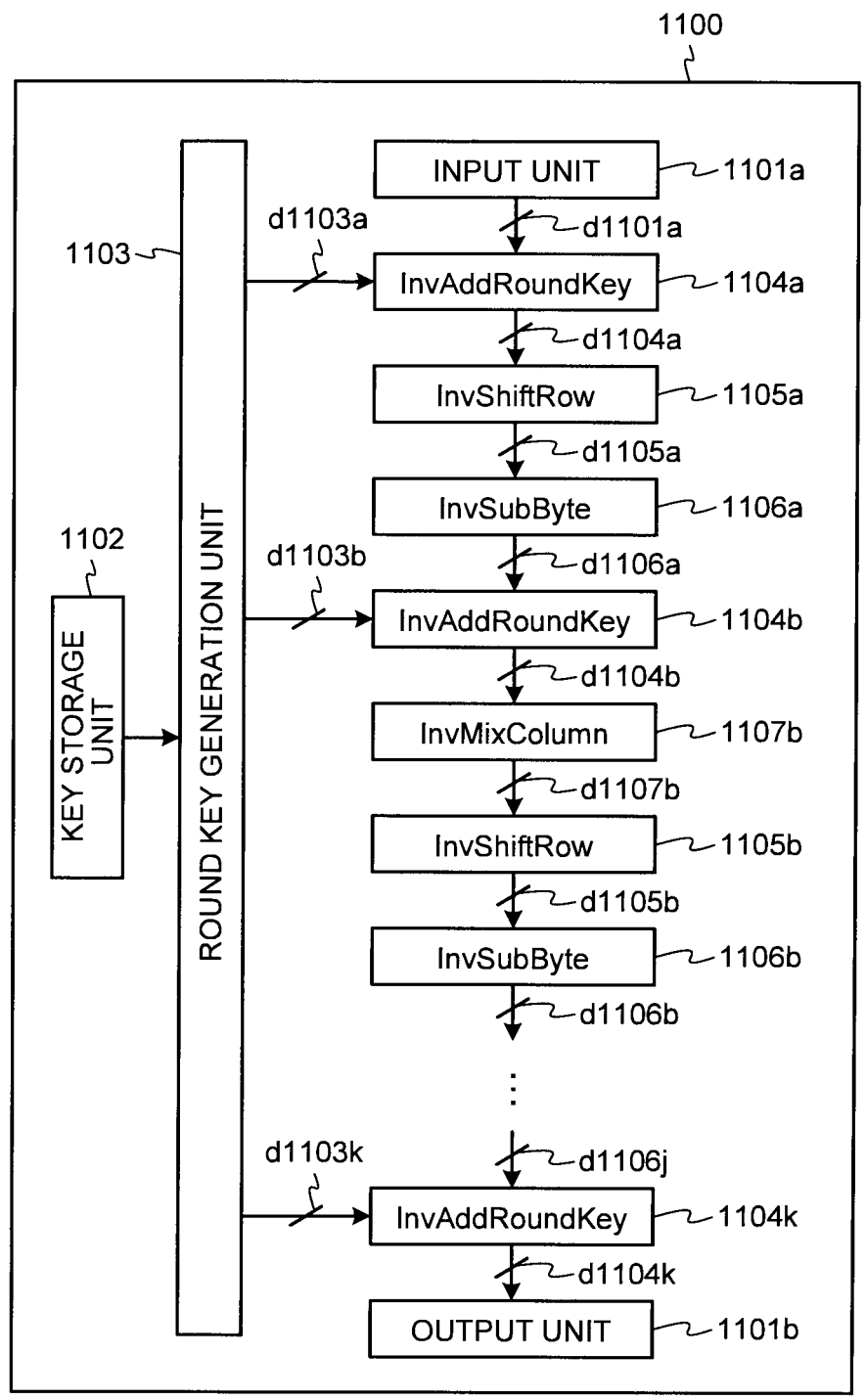
FIG. 2 is a block diagram showing a configuration example of a decryption device.

FIG. 2 is a block diagram showing an example of the configuration of a decryption device 1100. As shown in FIG. 2, the decryption device 1100 includes an input unit 1101a, an output unit 1101b, a key storage unit 1102, a round key generation unit 1103, InvAddRoundKey 1104a to 1104k, InvShiftRow 1105a to 1105j, InvSubByte 1106a to 1106j, and InvMixColumn 1107b to 1107j.

The input unit 1101a receives an input of encrypted data from the outside. The output unit 1101b outputs plain data of a processing result to the outside. An input/output unit 1101 having the functions of the input unit 1101a and the output unit 1101b may be provided.

The key storage unit 1102 stores a 128-bit secret key. The key storage unit 1102 can be formed by a generally used storage medium, such as a Hard Disk Drive (HDD), an optical disk, a memory card, or a Random Access Memory (RAM).

The round key generation unit 1103 calculates eleven round keys, which are 128-bit round keys d1103a to d1103k, from the secret key stored in the key storage unit 1102, and supplies the round keys d1103a to d1103k to the InvAddRoundKey 1104a to 1104k. The round keys d1103a to d1103k may be calculated before the InvAddRoundKey 1104a is executed or may be calculated in parallel with the execution of the InvAddRoundKey 1104a to 1104k.

Data d1101a which is input to the InvAddRoundKey 1104a is the same as input encrypted data.

The InvAddRoundKey 1104a to 1104k perform InvAddRoundKey transform processing, which is defined by AES encryption, on data d1101a and d1106a to d1106j, and output data d1104a to d1104k. Data d1104a is input to the InvShiftRow 1105a. Data d1104b to d1104j are input to the InvMixColumn 1107b to 1107j. Data d1104k is the same as plain data to be output.

The InvShiftRow 1105a to 1105j rearrange data d1104a and d1107b to d1107j in units of eight-bit blocks, and output data d1105a to d1105j. Data d1105a to d1105j are input to the InvSubByte 1106a to 1106j.

The InvSubByte 1106a to 1106j nonlinearly transform data d1105a to d1105j for every eight bits, and output data d1106a to d1106j. Data d1106a to d1106j are input to the InvAddRoundKey 1104b to 1104k.

The InvMixColumn 1107b to 1107j linearly transform data d1104b to d1104j for every 32 bits, and output data d1107b to d1107j. Data d1107b to d1107j are input to the InvShiftRow 1105b to 1105j.

First Embodiment

Although in the following description, a case will be described where an embodiment is applied to encryption processing (the encryption device 1000 or the like), the embodiment may be applied to decryption processing (the decryption device 1100 or the like).

Next, the terms are defined. Intermediate data of encryption processing refers to data which is calculated during processing defined by an encryption algorithm. In the case of AES encryption, data which is input/output to AddRoundKey, SubByte, ShiftRow, and MixColumn and data which is internally handled, correspond to intermediate data.

Mask is data which is applied through exclusive OR, arithmetic addition, or multiplication to intermediate data of the encryption processing so as to eliminate the correlation between intermediate data of the encryption processing and power consumption. The mask which is applied to input data to the SubByte is referred to as an input mask (first mask), and the mask which is applied to output data from the SubByte is referred to as an output mask (second mask). In the description of the embodiments, an example will be described where a mask is applied through exclusive OR.

Figure 3:
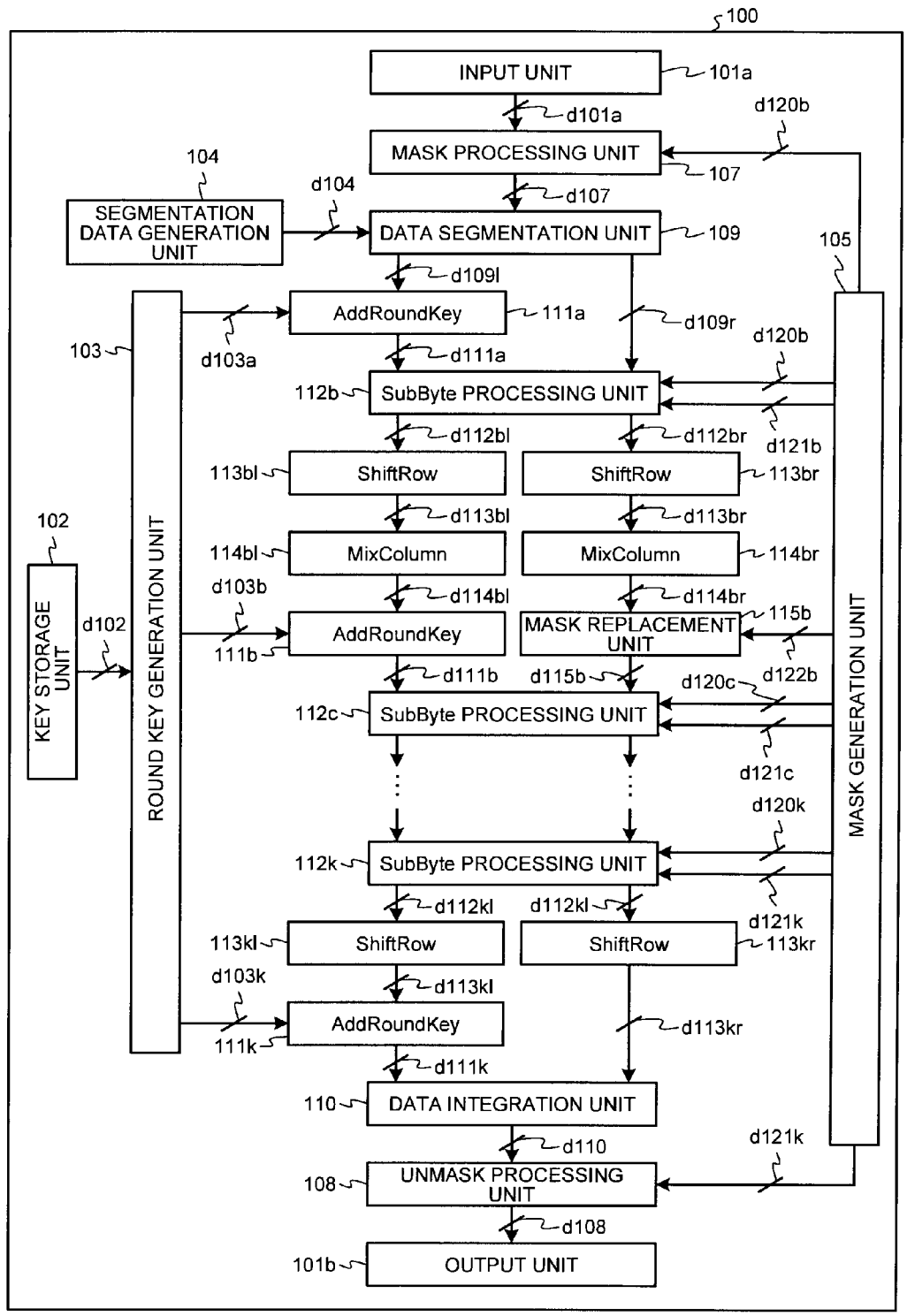
FIG. 3 is a block diagram showing a configuration example of an encryption device of a first embodiment.

FIG. 3 is a block diagram showing a configuration example of an encryption device 100 of the first embodiment, which processes encryption algorithm AES. The encryption device 100 includes an input unit 101a, an output unit 101b, a key storage unit 102, a round key generation unit 103, a segmentation data generation unit 104, a mask generation unit 105, a mask processing unit 107, an unmask processing unit 108, a data segmentation unit 109, a data integration unit 110, AddRoundKey 111a to 111k, SubByte processing units 112b to 112k, ShiftRow 113bl to 113kl, ShiftRow 113br to 113kr, MixColumn 114bl to 114jl, MixColumn 114br to 114jr, and mask replacement units 115b to 115j.

AddRoundKey 111a to 111k correspond to a first processing unit. SubByte processing units 112b to 112k correspond to a nonlinear transform unit. The ShiftRow 113bl to 113kl, the ShiftRow 113br to 113kr, the MixColumn 114bl to 114jl, the MixColumn 114br to 114jr, which process two pieces of data output from the SubByte processing unit 112*b* to 112*k*, and the mask replacement units 115*b* to 115*j* correspond to a second processing unit.

The input unit 101*a* receives 128-bit plain data d101*a* from the outside, and supplies plain data d101*a* to the mask processing unit 107. The output unit 101*b* outputs encrypted data d108 of a processing result to the outside. The key storage unit 102 stores a 128-bit secret key.

The round key generation unit 103 calculates eleven 128-bit round keys d103*a* to d103*k* from the secret key stored in the key storage unit 102, and supplies the round keys d103*a* to d103*k* to the AddRoundKey 111*a* to 111*k*. The round keys d103*a* to d103*k* may be calculated before the AddRoundKey 111*a* is executed or may be calculated in parallel with the execution of the AddRoundKey 111*a* to 111*k*.

The segmentation data generation unit 104 generates 128-bit segmentation data d104, and supplies segmentation data d104 to the data segmentation unit 109. Segmentation data d104 may be a value which is prepared in advance, or the segmentation data generation unit 104 may include a random number generation unit and a random number generated by the random number generation unit may be used.

The mask generation unit 105 generates input masks d120*b* to d120*k* and output masks d121*b* to d121*k*. The mask generation unit 105 generates replacement masks d122*b* to d122*j* from the input masks d120*c* to d120*k* and the output masks d121*b* to d121*j*. The mask generation unit 105 supplies the input mask d120*b* to the mask processing unit 107, and respectively supplies the input masks d120*b* to d120*k* and the output masks d121*b* to d121*k* to the SubByte processing units 112*b* to 112*k*. The mask generation unit 105 supplies the output mask d121*k* to the unmask processing unit 108, and respectively supplies the replacement masks d122*b* to d122*j* to the mask replacement units 115*b* to 115*j*.

Each mask may be a value which is prepared in advance, or the mask generation unit 105 may include a random number generation unit, and a random number generated by the random number generation unit may be used. The random number generation unit provided in the mask generation unit 105 may be the same as the random number generation unit provided in the segmentation data generation unit 104.

The mask generation unit 105 calculates the replacement mask d122*b*, for example, by d122*b*=d120*b*^d121*b*. "A^B" means the exclusive OR of A and B.

The mask processing unit 107 calculates the exclusive OR of the input mask d120*b* and plain data d101*a*, and outputs the result to the data segmentation unit 109 as masked plain data d107.

The data segmentation unit 109 segments 128-bit masked plain data d107 on the basis of segmentation data d104 and outputs two pieces of 128-bit segmented data d109*l* and d109*r* such that the exclusive OR of d109*l* and d109*r* coincide with masked plain data d107. For example, segmentation data d104 can be used as segmented data d109*l*, and the exclusive OR of segmentation data d104 and masked plain data d107 can be used as segmented data d109*r*.

As described above, in this embodiment, an operation of generating a plurality of pieces of data from data, with which the exclusive OR of the pieces of data matches, is called segmentation. Each piece of generated data is called segmented data.

The AddRoundKey 111*a* calculates data d111*a* which is the exclusive OR of input data d109*l* and the round key d103*a*, and outputs the result to the SubByte processing unit 112*b*. Similarly, the AddRoundKey 111*b* to 111*k* also calculate and output the exclusive OR of input data and the round key.

The SubByte processing unit 112*b* receives two pieces of data d111*a* and d109*r*, and outputs two pieces of data d112*bl* and d112*br*. Data d111*a* and d109*r* have a relationship in which the exclusive OR thereof becomes the exclusive OR of data d1004*a* input to the SubByte 1005*b* of FIG. 1 and the input mask d120*b*. Data d112*bl* and d112*br* have a relationship in which the exclusive OR thereof becomes the exclusive OR of data d1005*b* output from the SubByte 1005*b* of FIG. 1 and the output mask d121*b*.

The ShiftRow 113*bl* to 113*kl*, the ShiftRow 113*br* to 113*kr*, and the MixColumn 114*bl* to 114*jl*, and the MixColumn 114*br* to 114*jr* mix input data.

The mask replacement unit 115*b* calculates and outputs data d115*b* which is the exclusive OR of input data d114*br* and the replacement mask d122*b*. Similarly, the mask replacement units 115*c* to 115*j* output the exclusive OR of input data d114*cr* to d114*jr* and the replacement masks d122*c* to d122*j*.

The data integration unit 110 calculates and outputs data d110 which is the exclusive OR of data d111*k* and data d113*kr*. The unmask processing unit 108 calculates and outputs encrypted data d108 which is the exclusive OR of data d110 and the output mask d121*k*. The output unit 101*b* receives encrypted data d108 and outputs encrypted data d108 to the outside.

Figure 4:
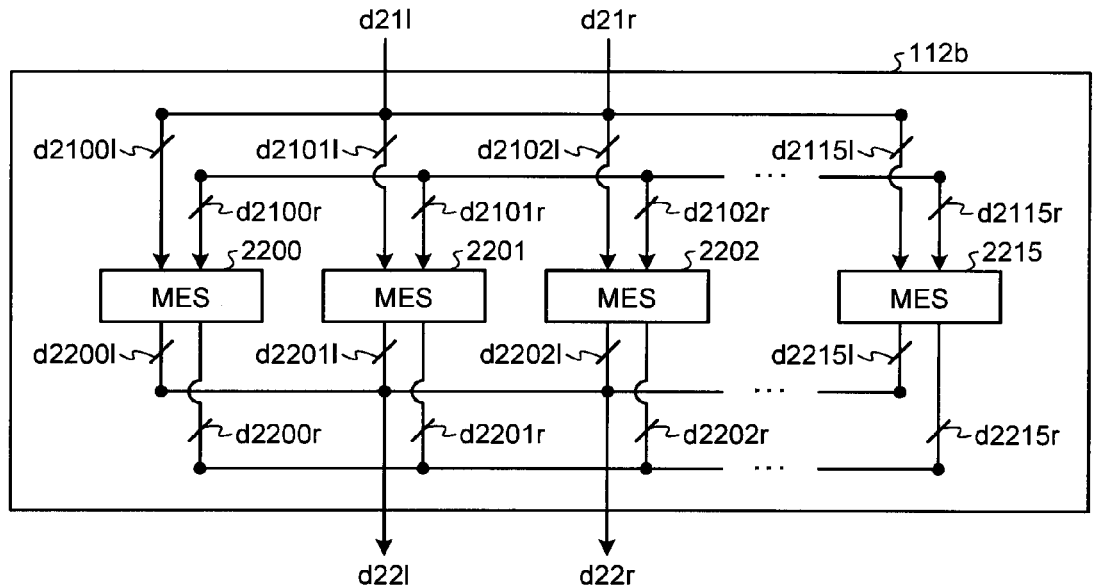
FIG. 4 is a block diagram showing a configuration example of a SubByte processing unit.

Next, a configuration example of the SubByte processing unit 112*b* will be described. FIG. 4 is a block diagram showing a configuration example of the SubByte processing unit 112*b*. The configuration of each of the SubByte processing units 112*c* to 112*k* is the same as the SubByte processing unit 112*b*, thus description thereof will be omitted.

The SubByte processing unit 112*b* includes 16 masked and extended S-boxes (hereinafter, referred to as MES) 2200 to 2215.

The SubByte processing unit 112*b* segments 128-bit data d21*l* into eight-bit data d2100*l* to d2115*l* satisfying d21*l*=d2100*l*|| . . . ||d2115*l* (|| means connection), and inputs data d2100*l* to d2115*l* to the MESs 2200 to 2215. Similarly, the SubByte processing unit 112*b* segments 128-bit data d21*r* into eight-bit data d2100*r* to d2115*r* satisfying d21*r*=d2100*r*|| . . . ||d2115*r*, and inputs data d2100*r* to d2115*r* to the MESs 2200 to 2215.

The SubByte processing unit 112*b* connects eight-bit data d2200*l* to d2215*l* output from the MESs 2200 to 2215 into d22*l* satisfying d22*l*=d2200*l*|| . . . ||d2215*l* and outputs the result. Similarly, the SubByte processing unit 112*b* connects eight-bit data d2200*r* to d2215*r* output from the MESs 2200 to 2215 into d22*r* satisfying d22*r*=d2200*r*|| . . . ||d2215*r* and outputs the result.

The MES 2200 receives two pieces of data d2100*l* and d2100*r*, and outputs two pieces of data d2200*l* and d2200*r*. The MESs 2201 to 2215 are operated in the same manner.

Figure 5:
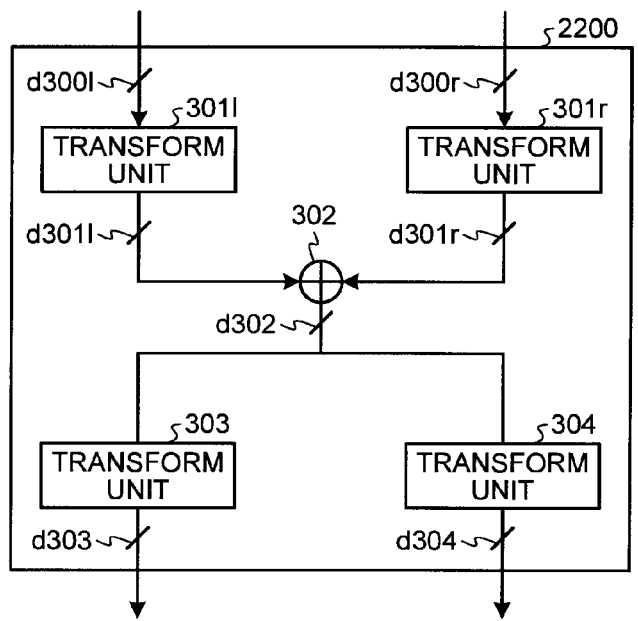
FIG. 5 is a block diagram showing a configuration example of an MES.

FIG. 5 is a block diagram showing a configuration example of the MES 2200. Hereinafter, an example will be described where data in units of eight bits is processed.

The MES 2200 includes a transform unit 301*l*, a transform unit 301*r*, a transform unit 303, a transform unit 304, and an exclusive OR operation unit 302. The MES 2200 inputs data d300*l* to the transform unit 301*l*, inputs data d300*r* to the transform unit 301*r*, and calculates data d302 which is the exclusive OR of data d301*l* output from the transform unit 301*l* and data d301*r* output from the transform unit 301*r*. The MES 2200 inputs data d302 to the transform unit 303 and the transform unit 304, outputs data d303 transformed by the transform unit 303, and outputs data d304 transformed by the transform unit 304.

The transform unit 301*l* receives data d300*l* as an input and outputs data d301*l* transformed through transform processing including linear transform. For example, the transform unit 301*l* may be configured to transform to output data d301*l* which is the result of exclusive OR of data linearly transformed from input data d300*l* by a function φ described below and transforming data d301*a*. The transform unit 301*l* may be configured to output data d301*l* linearly transformed from input data d300*l*.

The transform unit 301*r* receives data d300*r* as an input and outputs data d301*r* transformed through transform processing including linear transform. For example, the transform unit 301*r* may be configured to transform to output data d301*r* which is the result of exclusive OR of data linearly transformed from input data d300*r* by the function φ and transforming data d301*b*. The transform unit 301*r* may be configured to output data d301*r* linearly transformed from input data d300*r*.

The function φ is a function having an eight-bit input/output, and the following expression (1) can be used. $x_i$ and $y_i$ ($0 \leq i \leq 7$) respectively represent one-bit data. The input of the function φ is $x_i$ and the output of the function φ is $y_i$.

$$\begin{bmatrix} y_0 \\ y_1 \\ y_2 \\ y_3 \\ y_4 \\ y_5 \\ y_6 \\ y_7 \end{bmatrix} = \begin{bmatrix} 0 & 1 & 1 & 0 & 0 & 0 & 0 & 1 \\ 1 & 1 & 0 & 0 & 0 & 0 & 1 & 0 \\ 0 & 0 & 1 & 0 & 1 & 1 & 0 & 0 \\ 0 & 0 & 1 & 1 & 0 & 0 & 1 & 0 \\ 1 & 0 & 0 & 1 & 0 & 1 & 0 & 0 \\ 0 & 1 & 0 & 1 & 1 & 0 & 0 & 0 \\ 1 & 0 & 0 & 0 & 1 & 0 & 0 & 1 \\ 0 & 0 & 0 & 0 & 0 & 1 & 1 & 1 \end{bmatrix} \begin{bmatrix} x_0 \\ x_1 \\ x_2 \\ x_3 \\ x_4 \\ x_5 \\ x_6 \\ x_7 \end{bmatrix} \quad (1)$$

The function φ is not limited to the expression (1), and for example, may be identical transform. In the case of identical transform, the transform processing by the function φ may not be performed. Transforming data d301*a* may be 0, and in this case, exclusive OR may not be performed. Transforming data d301*b* may be 0, and in this case, exclusive OR may not be performed. When transforming data d301*a*=0 and transforming data d301*b*=0, the transform unit 301*l* is the same as the transform unit 301*r*.

The transform unit 304 transforms input data d302 to data d304 using predetermined transform and outputs data d304. The transform unit 304 may be nonlinear transform, such as the SubByte (S-box) of AES, linear transform, such as the function φ, or arbitrary transform. The transform unit 304 may be identical transform, and in this case, transform processing may not be performed.

The transform unit 301*l*, the transform unit 301*r*, and the transform unit 304 may be configured such that a transform table is prepared in advance and transform processing is performed with reference to the prepared transform table.

Figure 6:
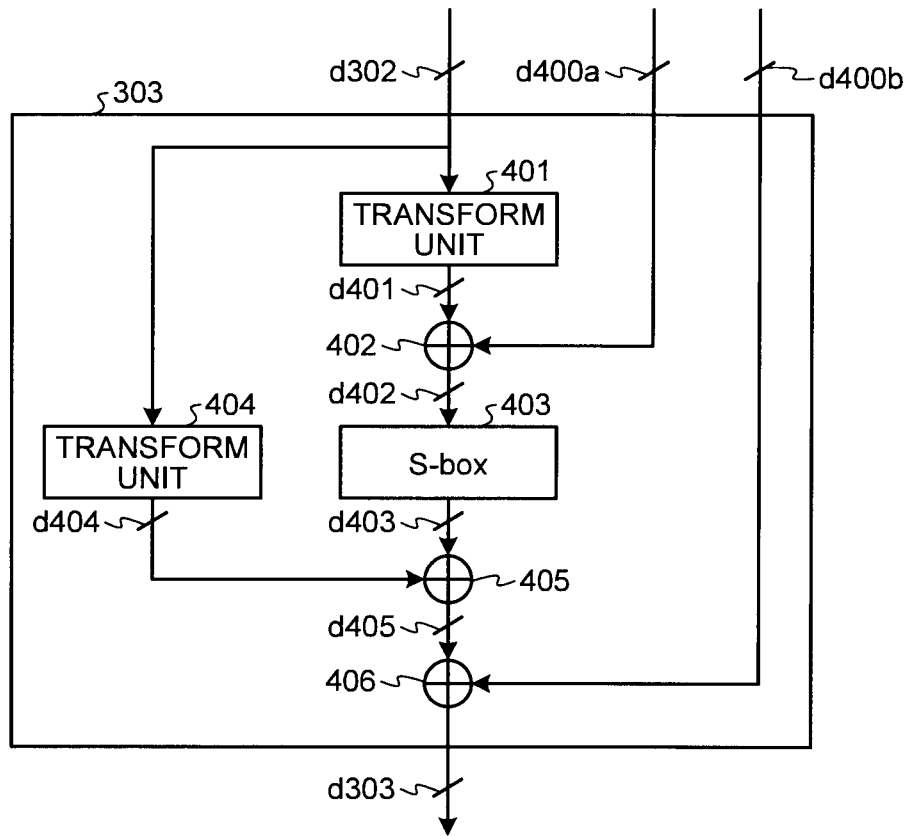
FIG. 6 is a block diagram showing a configuration example of a transform unit.

FIG. 6 is a block diagram showing a configuration example of the transform unit 303. The transform unit 303 includes a transform unit 401, an exclusive OR operation unit 402, an S-box 403, a transform unit 404, an exclusive OR operation unit 405, and an exclusive OR operation unit 406. The transform unit 303 receives data d302, d400*a*, and d400*b*. Data d302 is input to the transform unit 401. The transform unit 401 transforms data d302 to data d401. The exclusive OR operation unit 402 calculates data d402 which is the exclusive OR of data d401 and data d400*a*, and inputs the result to the S-box 403. The transform unit 404 transforms data d302 to data d404. The exclusive OR operation unit 405 calculates data d405 which is the exclusive OR of data d403 output from the S-box 403 and d404. The exclusive OR operation unit 406 calculates and outputs data d303 which is the exclusive OR of data d405 and d400*b*.

Data d400*a* is one of sixteen pieces of data obtained by segmenting the 128-bit input mask d120*b* output from the mask generation unit 105 in units of eight bits. Data d400*b* is one of sixteen pieces of data obtained by segmenting the 128-bit output mask d121*b* output from the mask generation unit 105 in units of eight bits.

The transform unit 401 is configured to transform data, which is the result of exclusive OR of transforming data d301*a* and transforming data d301*b* to input data d302, using an inverse function $φ^{-1}$ of the function φ and configured to output data d401. The inverse function $φ^{-1}$ of the function φ is expressed by, for example, the following expression (2).

$$\begin{bmatrix} y_0 \\ y_1 \\ y_2 \\ y_3 \\ y_4 \\ y_5 \\ y_6 \\ y_7 \end{bmatrix} = \begin{bmatrix} 0 & 1 & 0 & 0 & 1 & 1 & 1 & 1 \\ 1 & 1 & 0 & 1 & 0 & 1 & 1 & 0 \\ 1 & 0 & 1 & 1 & 0 & 1 & 0 & 1 \\ 0 & 1 & 1 & 1 & 1 & 1 & 0 & 0 \\ 1 & 0 & 1 & 0 & 1 & 1 & 1 & 0 \\ 0 & 0 & 1 & 1 & 1 & 0 & 1 & 1 \\ 1 & 1 & 0 & 1 & 1 & 0 & 0 & 1 \\ 1 & 1 & 1 & 0 & 0 & 0 & 1 & 1 \end{bmatrix} \begin{bmatrix} x_0 \\ x_1 \\ x_2 \\ x_3 \\ x_4 \\ x_5 \\ x_6 \\ x_7 \end{bmatrix} \quad (2)$$

The S-box 403 is the same nonlinear transform as the SubByte (S-box) of AES, and transforms input data d402 to data d403.

The transform unit 404 is the same transform as the transform unit 304 of FIG. 5, and transforms input data d302 to data d404.

If S-box transform is denoted by S, the transform unit 404 is denoted by h, and the transform unit 401 is denoted by $g^{-1}$, the transform unit 303 satisfies the relationship of the following expression (3).

$$d303 = S(g^{-1}(d302) \hat{} d400a) \hat{} h(d302) \hat{} d400b \quad (3)$$

Figure 7:
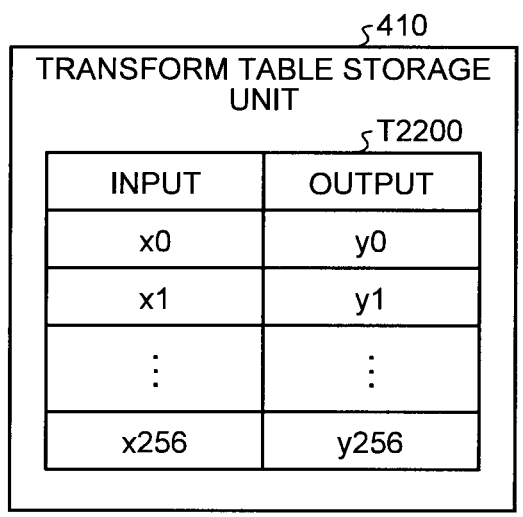
FIG. 7 is a diagram showing an example of a transform table which is stored in a transform table storage unit.

As long as the expression (3) is satisfied, the above-described calculation procedure may not be used. For this reason, the transform unit 303 may calculate output data d303 in advance when input data d302 is in a rage of 0 to 255, and may store data d303 as a transform table T2200, in which data d302 and data d303 are associated, in a transform table storage unit 410. In this case, the transform unit 303 receives data d302 and outputs data d303 corresponding to received data d302 with reference to the transform table T2200. FIG. 7 is a diagram showing an example of the transform table T2200 which is stored in the transform table storage unit 410.

Although a configuration example has been described where the SubByte processing unit 112*b* processes 128-bit data by eight bits, the units of processing is not limited to eight bits, and may be 16 bits or 128 bits. A different number of bits may be used as the units of processing. When the unit of processing is 128 bits, for example, the SubByte processing unit 112*b* may include a single MES 2200.

The MES 2200 to the MES 2215 provided in the SubByte processing unit 112*b* may have the same configuration. Similarly, the SubByte processing unit 112*c* to 112*k* may have the MES of the same configuration. The SubByte processing unit 112*b* to 112*k* may have the same configuration.

Although in FIG. 3, the AddRoundKey 111*b* to 111*k* are arranged in the left sequence of segmented data, the AddRoundKey 111*b* to 111*k* may be arranged on the right sequence of segmented data. In this case, the AddRoundKey 111*b* receives data d115*b* output from the mask replacement unit 115*b*, calculates data d111*b* which is the exclusive OR of the round key d103*b* and data d115*b*, and outputs data d111*b* to the SubByte processing unit 112*c*. At this time, the Mix-Column 114*bl* outputs data d114*bl* to the SubByte processing unit 112*c*. Devices represented by the same numeral may be the same device.

Figure 8:
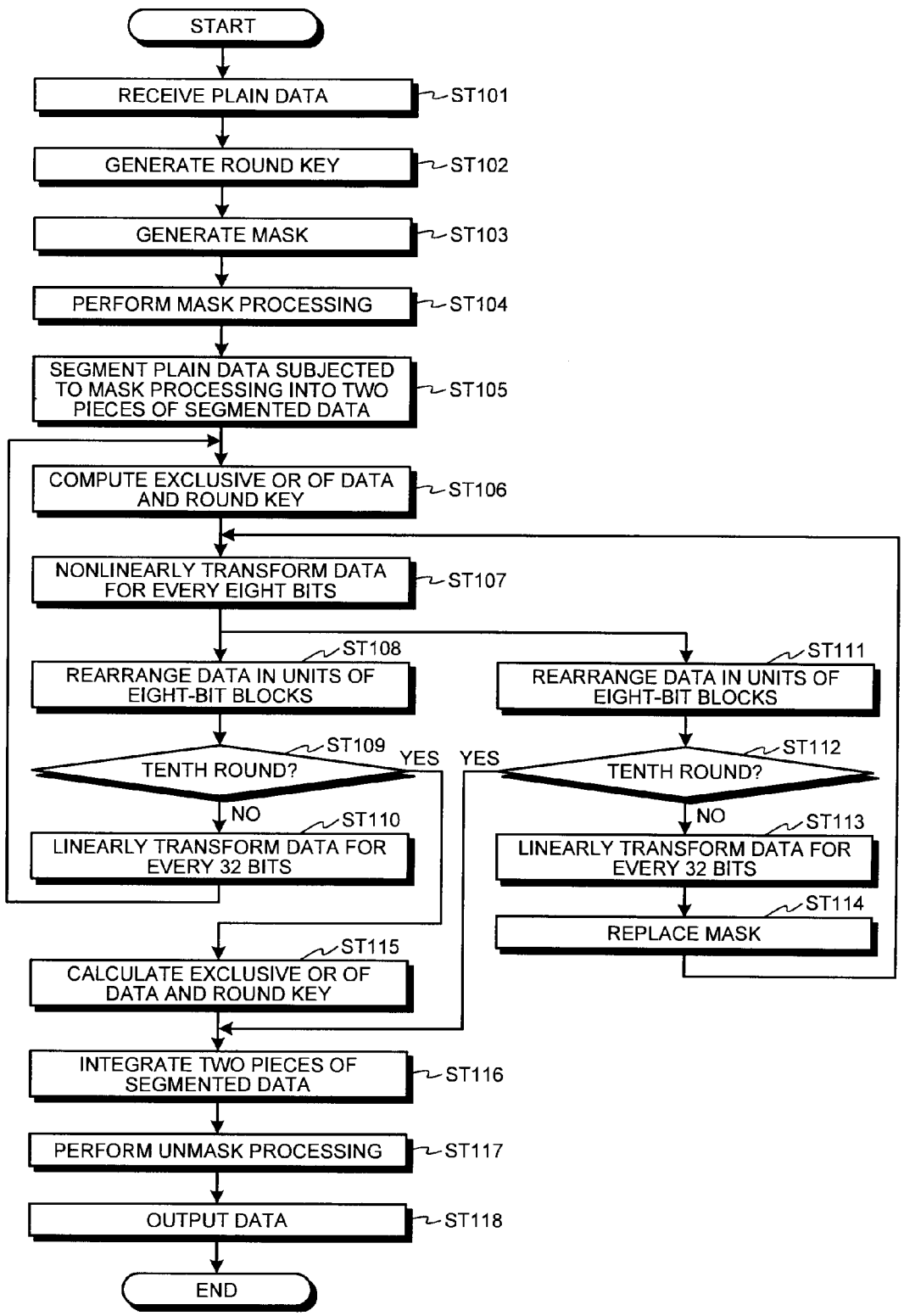
FIG. 8 is a flowchart showing an example of the overall flow of encryption processing of the first embodiment.

Next, a processing procedure of the encryption device 100 will be described with reference to a flowchart of FIG. 8. FIG. 8 is a flowchart showing an example of the overall flow of encryption processing in the encryption device 100 of the first embodiment when the same device is used for devices represented by the same numeral.

The input unit 101*a* of the encryption device 100 receives 128-bit plain data d101*a* (ST101). The round key generation unit 103 generates the round keys d103*a* to d103*k* on the basis of an encryption key d102 supplied from the key storage unit 102, and respectively supplies the round keys d103*a* to d103*k* to the AddRoundKey 111*a* to 111*k* (ST102).

The mask generation unit 105 generates the input masks d120*b* to d120*k*, the output masks d121*b* to d121*k*, and the replacement masks d122*b* to d122*j* (ST103). The mask processing unit 107 processes input mask d120*b* on plain data d101*a* and outputs masked plain data d107 (ST104). Masked plain data d107 is the exclusive OR of plain data d101*a* and the input mask d120*b*.

The data segmentation unit 109 segments masked plain data d107 into two pieces of data d109*l* and data d109*r* on the basis of segmentation data d104 supplied from the segmentation data generation unit 104 (ST105). The exclusive OR of data d109*l* and data d109*r* is d107. For example, calculated are d109*l*=d104, and d109*r*=d107^d104.

The AddRoundKey 111*a* calculates and outputs data d111*a* which is the exclusive OR of round key d103*a* supplied from the round key generation unit 103 and data d109*l* (ST106).

The SubByte processing unit 112*b* receives data d111*a* output from the AddRoundKey 111*a*, data d109*r* output from the data segmentation unit 109, the input mask d120*b*, and the output mask d121*b*, performs nonlinear transform processing in a state of being masked, and outputs two pieces of data d112*bl* and data d112*br* (ST107).

The ShiftRow 113*bl* rearranges data d112*bl* output from the SubByte processing unit 112*b* in units of eight-bit blocks (ST108).

The encryption device 100 determines whether or not the round number is tenth (ST109). When the round number is first to ninth (No in ST109), the MixColumn 114*bl* linearly transforms data d113*bl* output from the ShiftRow 113*bl* for every 32 bits, and outputs data d114*bl* after transform to the AddRoundKey 111*b* (ST110).

The ShiftRow 113*br* rearranges data d112*br* output from the SubByte processing unit 112*b* in units of eight-bit blocks (ST111).

The encryption device 100 determines whether or not the round number is tenth (ST112).

When the round number is first to ninth (No in ST112), the MixColumn 114*br* linearly transforms data d113*br* output from the ShiftRow 113*br* for every 32 bits, and outputs data d114*br* after transform to the mask replacement unit 115*b* (ST113).

The mask replacement unit 115*b* calculates data d115*b* which is the exclusive OR of data d114*br* output from the MixColumn 114*br* and the replacement mask d122*b* supplied from the mask generation unit 105, and outputs data d115*b* to the SubByte processing unit 112*c* (ST114).

The SubByte processing unit 112*c* receives data d111*b* output from the AddRoundKey 111*b* and data d115*b* output from the mask replacement unit 115*b*, performs nonlinear transform processing in a state of being masked, and outputs two pieces of data d112*cl* and data d112*cr* (ST107).

The AddRoundKey 111*b* to 111*j* in the first to tenth rounds perform the same processing as the AddRoundKey 111*a*, the SubByte processing units 112*c* to 112*k* in the second to tenth rounds perform the same processing as the SubByte processing unit 112*b*, the ShiftRow 113*cl* to 113*kl* and the ShiftRow 113*cr* to 113*kr* in the second to tenth rounds perform the same processing as the ShiftRow 113*bl* and the ShiftRow 113*br*, the MixColumn 114*cl* to 114*jl* and the MixColumn 114*cr* to 114*jr* in the second to ninth rounds perform the same processing as the MixColumn 114*bl* and the MixColumn 114*br*, and the mask replacement units 115*c* to 115*j* in the second to ninth rounds perform the same processing as the mask replacement unit 115*b*. Thus, description thereof will be omitted.

When the round number is tenth (Yes in ST109, Yes in ST112), the AddRoundKey 111*k* outputs data clink, which is the exclusive OR of the round key d103*k* supplied from the round key generation unit 103 and data d113*kl* output from the ShiftRow 113*kl*, to the data integration unit 110 (ST115).

The data integration unit 110 calculates data d110 which is the exclusive OR of data d113*kr* as masked encrypted data output from the ShiftRow 113*kr* and data d111*k* output from the AddRoundKey 111*k*, and outputs data d110 to the unmask processing unit 108 (ST116).

The unmask processing unit 108 removes output mask d121*k* from masked encrypted data d110, and calculates encrypted data d108 (ST117). Encrypted data d108 is the exclusive OR of masked encrypted data d110 and the output mask d121*k*. The output unit 101*b* outputs encrypted data d108 (ST118).

Figure 9:
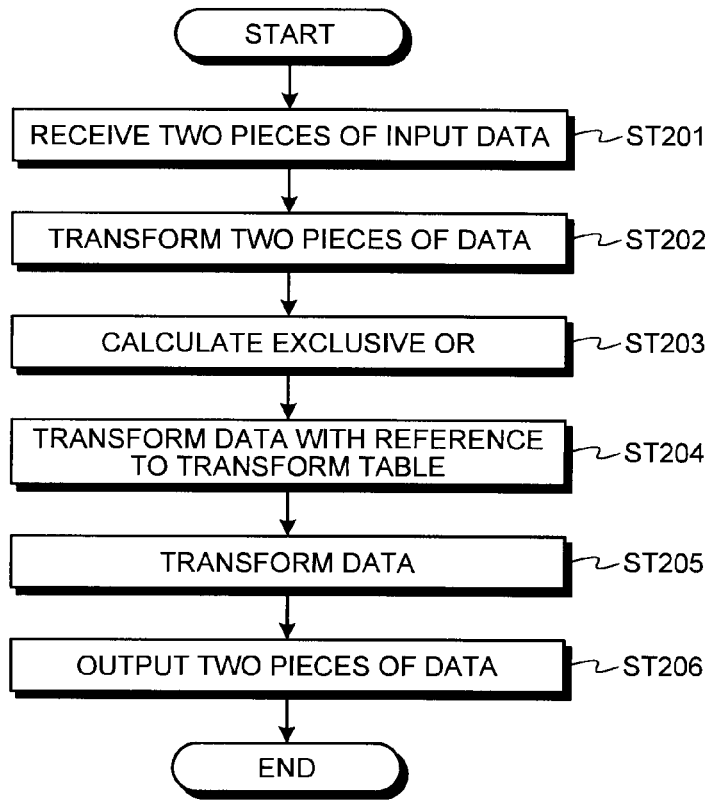
FIG. 9 is a flowchart showing an example of a processing procedure of an MES when a transform table is used.

A processing procedure of the MES 2200 when the MES 2200 generates the transform table T2200 in advance will be described with reference to FIG. 9. FIG. 9 is a flowchart showing an example of a processing procedure of the MES 2200 when a transform table is used.

The MES 2200 receives two pieces of data d300*l* and data d300*r* (ST201). The transform unit 301*l* transforms data d300*l* and outputs d301*l*, and the transform unit 301*r* transforms data d300*r* and outputs d301*r* (ST202).

The MES 2200 calculates the exclusive OR of data d301*l* and data d301*r*, and supplies the result to the transform unit 303 and the transform unit 304 (ST203). The transform unit 303 references the transform table T2200, and obtains data d303 corresponding to data d302 (ST204). The transform unit 304 transforms data d302 to d304 using predetermined transform (ST205). The MES 2200 outputs data d303 and data d304 (ST206).

According to this embodiment, the input/output of the MES 2200 satisfies the relationship of the following expression (4).

$$(d303\hat{\ }d304)\hat{\ }d400b = S((d300l\hat{\ }d300r)\hat{\ }d400a) \qquad (4)$$

The MES 2200 receives two pieces of data segmented from masked intermediate data of encryption processing as an input, and performs nonlinear transform in a state of being masked, thereby outputting segmented data of the correction calculation result.

The secondary DPA identifies a secret key by using power consumption at two points of processing the mask and masked intermediate data, or power consumption of two pieces of intermediate data with the same mask of the encryption processing. In this embodiment, the encryption processing is performed in a state where masked intermediate data of the encryption processing is segmented. Thus, power consumption at the time when masked intermediate data of the encryption processing is processed cannot be measured. For this reason, there is resistance against the secondary DPA. Also, power consumption at the time when the intermediate data of the encryption processing is processed cannot be measured. The correlation between intermediate data of the encryption processing and power consumption is eliminated, and there is resistance against power analysis.

When all the SubByte processing units 112b to 112k have the same configuration, the input masks d120b to d120k can be set as identical data, the output masks d121b to d121k can be set as identical data, and the replacement mask d122b to d122k can be set as identical data.

When all the MESs 2200 to 2215 provided in the SubByte processing unit 112b have the same configuration, the same input mask and output mask can be used for all the MESs. Thus, the 128-bit input mask d120b can be set to eight-bit data, and the 128-bit output mask d121b can be set to eight-bit data. With regard to the SubByte processing units 112c to 112k, when the input mask and the output mask have eight bits, the 128-bit replacement masks d122b to d122j can be set to eight-bit data.

When all the SubByte processing units 112b to 112k have the same configuration, and all the MESs provided in the SubByte processing units 112b to 112k have the same configuration, the encryption device 100 can perform the encryption processing by using a single MES. In implementing with use of a transform table, the encryption device 100 can calculate SubByte by generating and storing a single transform table, and can reduce the circuit size, storage capacity, processing time, and power consumption while having resistance against the secondary DPA.

Modification of First Embodiment

Figure 10:
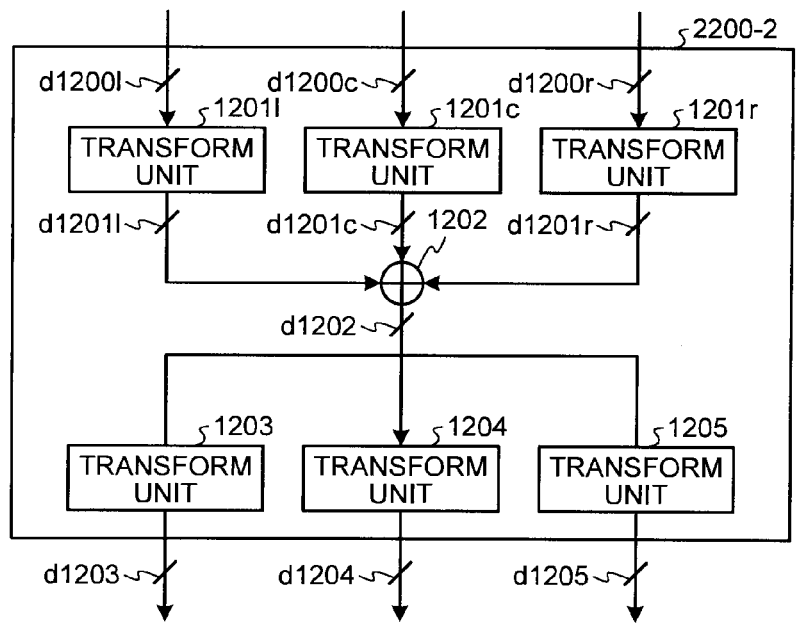
FIG. 10 is a block diagram showing a configuration example of an MES of a modification.

FIG. 10 is a block diagram showing a configuration example of an MES 2200-2 which is a modification of the MES 2200. Hereinafter, an example will be described where eight-bit data is processed.

The MES 2200-2 includes a transform unit 1201*l*, a transform unit 1201c, a transform unit 1201r, a transform unit 1203, a transform unit 1204, a transform unit 1205, and an exclusive OR operation unit 1202.

The MES 2200-2 inputs data d1200*l* to the transform unit 1201*l*, inputs data d1200c to the transform unit 1201c, and inputs data d1200r to the transform unit 1201r. The MES 2200-2 calculates data d1202 which is the exclusive OR of data d1201*l* output from the transform unit 1201*l*, data d1201c output from the transform unit 1201c, and data d1201r output from the transform unit 1201r. The MES 2200-2 inputs data d1202 to the transform unit 1203, the transform unit 1204, and the transform unit 1205. The MES 2200-2 outputs data d1203 transformed by the transform unit 1203, outputs data d1204 transformed by the transform unit 1204, and data d1205 transformed by the transform unit 1205.

The transform unit 1201*l* receives data d1200*l* as an input and outputs data d1201*l*. For example, the transform unit 1201*l* is configured to transform to output data d1201*l* which is the result of exclusive OR of data transformed from input data d1200*l* by the function φ and transforming data d301a. Transforming data may be 0, and in this case, exclusive OR may not be performed.

The transform unit 1201c receives data d1200c as an input and outputs data d1201c. For example, the transform unit 1201c is configured to transform to output data d1201c which is the result of exclusive OR of data transformed from input data d1200c by the function φ and transforming data d301b. Transforming data may be 0, and in this case, exclusive OR may not be performed.

The transform unit 1201r receives data d1200r as an input and outputs data d1201r. For example, the transform unit 1201r is configured to transform to output data d1201r which is the result of exclusive OR of data transformed from input data d1200r by the function φ and transforming data d301c. Transforming data may be 0, and in this case, exclusive OR may not be performed.

The transform unit 1204 transform input data d1202 to data d1204 by using predetermined transform and outputs data d1204. The transform unit 1204 may be nonlinear transform, such as the SubByte (S-box) of AES, linear transform, such as the function φ, or arbitrary transform. The transform unit 1204 may be identical transform, and in this case, transform processing may not be performed.

The transform unit 1205 transforms input data d1202 to data d1205 by using predetermined transform and outputs data d1205. The transform unit 1205 may be nonlinear transform, such as the SubByte (S-box) of AES, linear transform, such as the function φ, or arbitrary transform. The transform unit 1205 may be identical transform, and in this case, transform processing may not be performed.

The transform unit 1201*l*, the transform unit 1201c, the transform unit 1201r, the transform unit 1203, the transform unit 1204, and the transform unit 1205 may prepare a transform table in advance, and may calculate the MES 2200-2 with reference to the prepared transform table.

Figure 11:
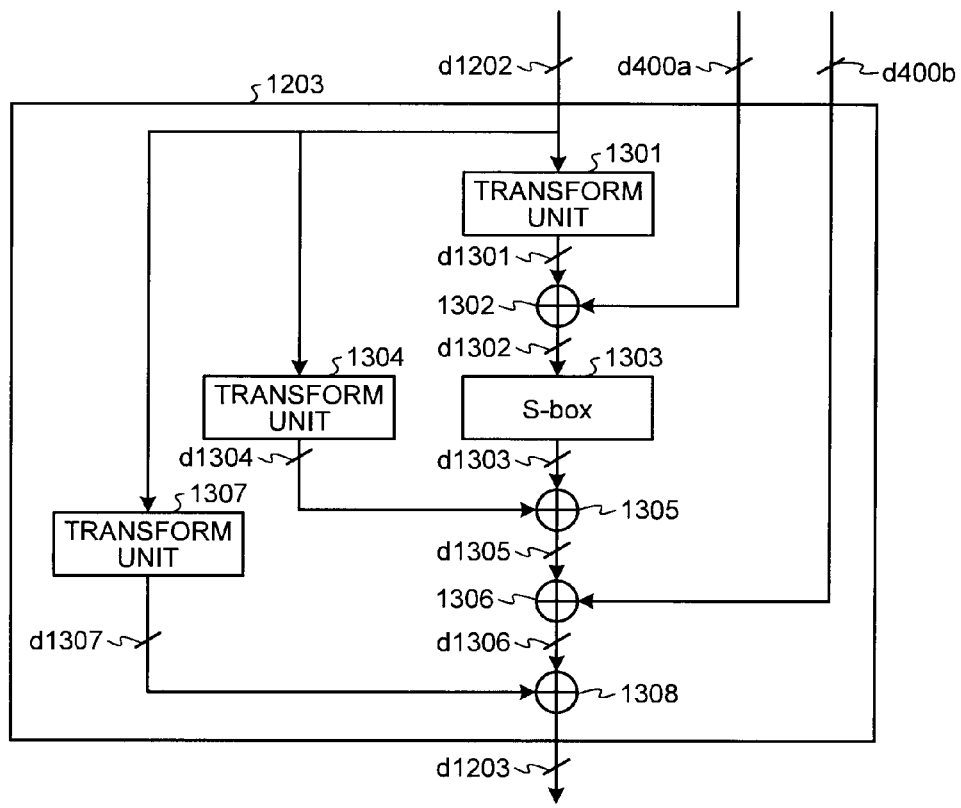
FIG. 11 is a block diagram showing a configuration example of a transform unit.

FIG. 11 is a block diagram showing a configuration example of the transform unit 1203. The transform unit 1203 includes a transform unit 1301, an exclusive OR operation unit 1302, an S-box 1303, a transform unit 1304, an exclusive OR operation unit 1305, an exclusive OR operation unit 1306, a transform unit 1307, and an exclusive OR operation unit 1308.

The transform unit 1203 receives data d1202, d400a, and d400b. The transform unit 1203 inputs data d1202 to the transform unit 1301, calculates data d1302 which is the exclusive OR of output data d1301 of the transform unit 1301 and data d400a, and inputs data d1302 to the S-box 1303. The transform unit 1203 transforms data d1202 to data d1304 in the transform unit 1304. The transform unit 1203 calculates data d1305 which is the exclusive OR of data d1303 output from the S-box 1303 and data d1304 output from the transform unit 1304. The transform unit 1203 calculates data d1306 which is the exclusive OR of data d1305 and data d400b. The transform unit 1203 transforms data d1202 to data d1307 in the transform unit 1307. The transform unit 1203 calculates and outputs data d1203 which is the exclusive OR of data d1306 and data d1307 output from the transform unit 1307.

Data d400a is one of sixteen pieces of data which are obtained by segmenting the 128-bit input mask d120b output from the mask generation unit 105 in units of eight bits. Data d400b is one of sixteen pieces of data which are obtained by segmenting the 128-bit output mask d121b output from the mask generation unit 105 in units of eight bits. For example, the transform unit 1301 is configured to transform and output the result of exclusive OR of input data d1202, transforming data d301a, and transforming data d301b to data d1301 by the inverse function $\phi^{-1}$ of the function φ.

The S-box 1303 is the same nonlinear transform as the SubByte (S-box) of AES, and transforms input data d1302 to d1303.

The transform unit 1304 is the same transform as the transform unit 1204, and transforms input data d1202 to d1304.

The transform unit 1307 is the same transform as the transform unit 1205, and transforms input data d1202 to d1307.

If S-box transform is denoted by S, the transform unit 1301 is denoted by $g^{-1}$, the transform unit 1304 is denoted by $h_1$, and the transform unit 1307 is denoted by $h_2$, the transform unit 1203 satisfies the relationship of the following expression (5).

$$d1203 = S(g^{-1}(d1202)\hat{\ }d400a)\hat{\ }h_1(d1202)\hat{\ }d400b\hat{\ }h_2(d1307) \quad (5)$$

As long as the expression (5) is satisfied, the above-described calculation procedure may not be provided. For example, when input data d1202 is in a range of 0 to 255, the transform unit 1203 may calculate output data d1203 in advance and may hold data d1203 as the transform table T2200 shown in FIG. 7. In this case, the transform unit 1203 receives data d1202, and outputs data d1203 corresponding to received data d1202 with reference to the transform table T2200.

As described above, in the encryption device of the first embodiment, the encryption processing is performed while masked intermediate data of the encryption processing is segmented. For this reason, power consumption at the time when masked intermediate data of the encryption processing is processed cannot be measured, and there is resistance against the second DPA.

Second Embodiment

Figure 12:
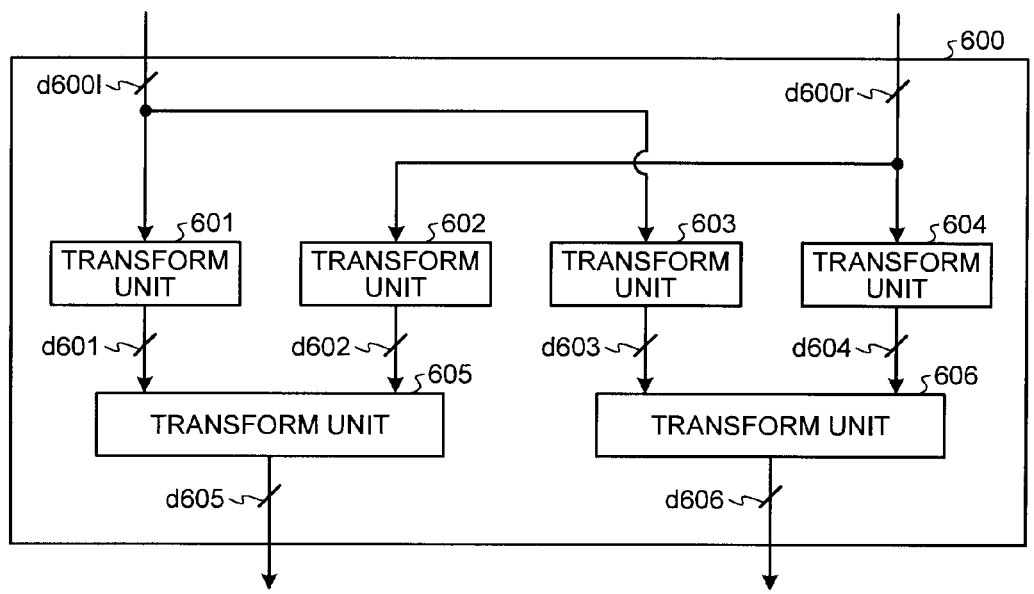
FIG. 12 is a block diagram showing a configuration example of an MES of a second embodiment.

A second embodiment is different from the first embodiment in that, in place of the MESs 2200 to 2215, MESs 600 are provided. FIG. 12 is a block diagram showing a configuration example of the MES 600. The MESs 601 to 615 have the same configuration as the MES 600, thus description thereof will be omitted.

The MES 600 includes a transform unit 601, a transform unit 602, a transform unit 603, a transform unit 604, a transform unit 605, and a transform unit 606.

The MES 600 receives two pieces of eight-bit data d600*l* and d600*r*, inputs data d600*l* to the transform unit 601 and the transform unit 603, and inputs data d600*r* to the transform unit 602 and the transform unit 604. The MES 600 inputs data d601 output from the transform unit 601 and data d602 output from the transform unit 602 to the transform unit 605. The MES 600 inputs data d603 output from the transform unit 603 and data d604 output from the transform unit 604 to the transform unit 606. The MES 600 outputs data d605 output from the transform unit 605 and data d606 output from the transform unit 606.

The transform unit 601 transforms data d600*l* to d601 by transform having inverse transform. The transform unit 602 transforms data d600*r* to d602 by transform having inverse transform. The transform unit 603 transforms data d600*l* to d603 by transform having inverse transform. The transform unit 604 transforms data d600*r* to d604 by transform having inverse transform.

The transform unit 601, the transform unit 602, the transform unit 603, and the transform unit 604 may be formed by using, for example, the function $\phi$ described in the first embodiment, the S-box of AES, or identical transform. When identical transform is used, transform processing may not be performed.

Figure 13:
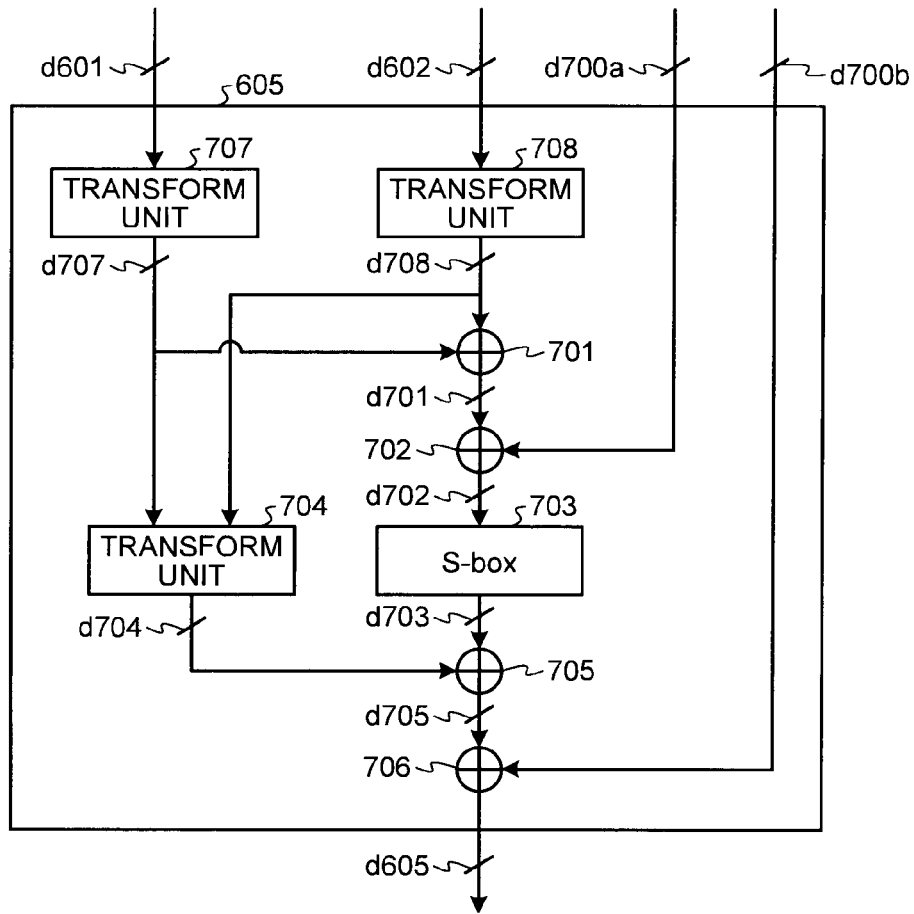
FIG. 13 is a block diagram showing a configuration example of a transform unit.
Figure 14:
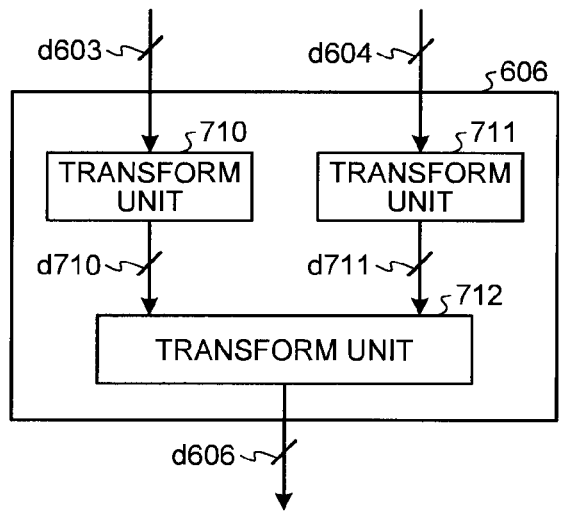
FIG. 14 is a block diagram showing a configuration example of a transform unit.

FIG. 13 is a block diagram showing a configuration example of the transform unit 605. FIG. 14 is a block diagram showing a configuration example of the transform unit 606.

The transform unit 605 includes an exclusive OR operation unit 701, an exclusive OR operation unit 702, an S-box 703, a transform unit 707, a transform unit 708, a transform unit 704, an exclusive OR operation unit 705, and an exclusive OR operation unit 706.

The transform unit 605 receives data d601, d602, d700*a*, and d700*b*, inputs data d601 to the transform unit 707, and input data d602 to the transform unit 708. The transform unit 605 calculates data d701 which is the exclusive OR of data d707 output from the transform unit 707 and data d708 output from the transform unit 708. The transform unit 605 calculates data d702 which is the exclusive OR of data d701 and data d700*a* and inputs data d702 to the S-box 703. The transform unit 605 inputs data d707 output from the transform unit 707 and data d708 output from the transform unit 708 to the transform unit 704. The transform unit 605 calculates data d705 which is the exclusive OR of data d703 output from the S-box 703 and data d704 output from the transform unit 704. The transform unit 605 calculates and outputs data d605 which is the exclusive OR of data d705 and data d700*b*.

Data d700*a* is one of sixteen pieces of data obtained by segmenting the 128-bit input mask d120*b* output from the mask generation unit 105 in units of eight bits. Data d700*b* is one of sixteen pieces of data obtained by segmenting the 128-bit output mask d121*b* output from the mask generation unit 105 in units of eight bits.

The S-box 703 is the same nonlinear transform as the S-box of AES, and transforms input data d702 to d703.

The transform unit 707 outputs the result d707 of inverse transform of the transform unit 601 on input data d601. The transform unit 708 outputs the result d708 of inverse transform of the transform unit 602 on input data d602. The transform unit 704 transforms input eight-bit data d707 and data d708 to eight-bit data d704 by predetermined transform and outputs data d704. The transform unit 704 may use arbitrary transform which has 16-bit input and eight-bit output.

When the transform unit 601 is identical transform, the transform unit 707 is also identical transform, and in this case, the transform processing of the transform unit 707 may not be performed. The same is applied to the transform unit 708. Even when the transform unit 704 is identical transform, the transform processing may not be performed.

The transform unit 606 includes a transform unit 710, a transform unit 711, and a transform unit 712. The transform unit 606 receives two pieces of eight-bit data d603 and data d604, input data d603 to the transform unit 710, and inputs data d604 to the transform unit 711. The transform unit 606 inputs data d710 output from the transform unit 710 and data d711 output from the transform unit 711 to the transform unit 712, and outputs data d606 output from the transform unit 712. The transform unit 712 outputs the result d606 of the same transform as the transform unit 704 on input data d710.

If S-box transform is denoted by S, Input/output data of the MES 600 satisfies the relationship of the following expression (6).

$$d605\hat{\ }d606\hat{\ }d700b = S(d600l\hat{\ }d600r\hat{\ }d700a) \quad (6)$$

The transform unit 605 may calculate output data d605 for input data d601 and data d602 in advance, and may hold data d605 as a transform table. In this case, the transform unit 605 receives input data d601 and data d602, and outputs corresponding data d605 with reference to the transform table.

The transform unit 606 may calculate output data d606 for input data d603 and data d604 in advance, and may hold data d606 as a transform table. In this case, the transform unit 606 receives input data d603 and data d604, and outputs corresponding data d606 with reference to the transform table.

The MES 600 may calculate output data d605 and data d606 for input data d600*l* and data d600*r* in advance, and may hold data d605 and data d606 as a transform table. In this case, the MES 600 receives input data d600*l* and data d600*r*, and outputs corresponding data d605 and data d606 with reference to the transform table.

Third Embodiment

Figure 15:
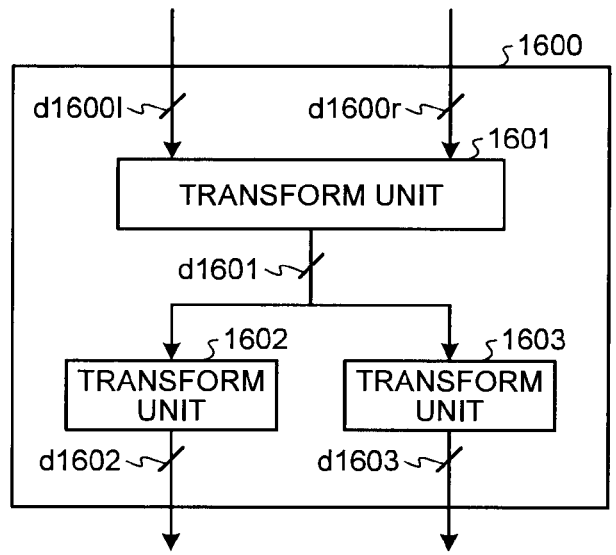
FIG. 15 is a block diagram showing a configuration example of an MES of a third embodiment.

A third embodiment is different from the first embodiment in that, in place of the MESs 2200 to 2215, MESs 1600 are provided. FIG. 15 is a block diagram showing a configuration example of the MES 1600. The MES 1601 to the MES 1615 have the same configuration as the MES 1600, thus description thereof will be omitted.

The MES 1600 includes a transform unit 1601, a transform unit 1602, and a transform unit 1603. The MES 1600 receives data d1600*l* and data d1600*r* which are segmented data of masked data under the encryption processing, and inputs data d1600*l* and data d1600*r* to the transform unit 1601. The MES 1600 inputs data d1601 output from the transform unit 1601 to the transform unit 1602 and the transform unit 1603. The MES 1600 outputs data d1602 output from the transform unit 1602 and data d1603 output from the transform unit 1603.

The transform unit 1601 receives eight-bit data d1600*l* and data d1600*r*, transforms the result of exclusive OR of data d1600*l* and d1600*r* and transforming data d1601*a* to eight-bit data by using the function φ, and outputs the result d1601 of exclusive OR of the transform result and transforming data d1601*b*. The function φ has an inverse function φ$^{-1}$. The function φ may be identical transform, and in this case, the transform processing may not be performed.

Transforming data d1601*a* and transforming data d1601*b* may be 0, and in this case, exclusive OR may not be performed.

The transform unit 1601 may be calculated by referencing a transform table calculated in advance. The transform table represents the correspondence relationship between input data d1600*l* and d1600*r* and output data d1601, and is generated in accordance with the function φ and transforming data d1601*a*.

The transform unit 1603 transforms data d1601 output from the transform unit 1601 to data d1603 by using predetermined transform and outputs data d1603. The transform unit 1603 may be nonlinear transform, such as S-box, linear function, such as the function φ described in the first embodiment, or arbitrary transform. The transform unit 1603 may be identical transform, and in this case, the transform processing may not be performed.

Figure 16:
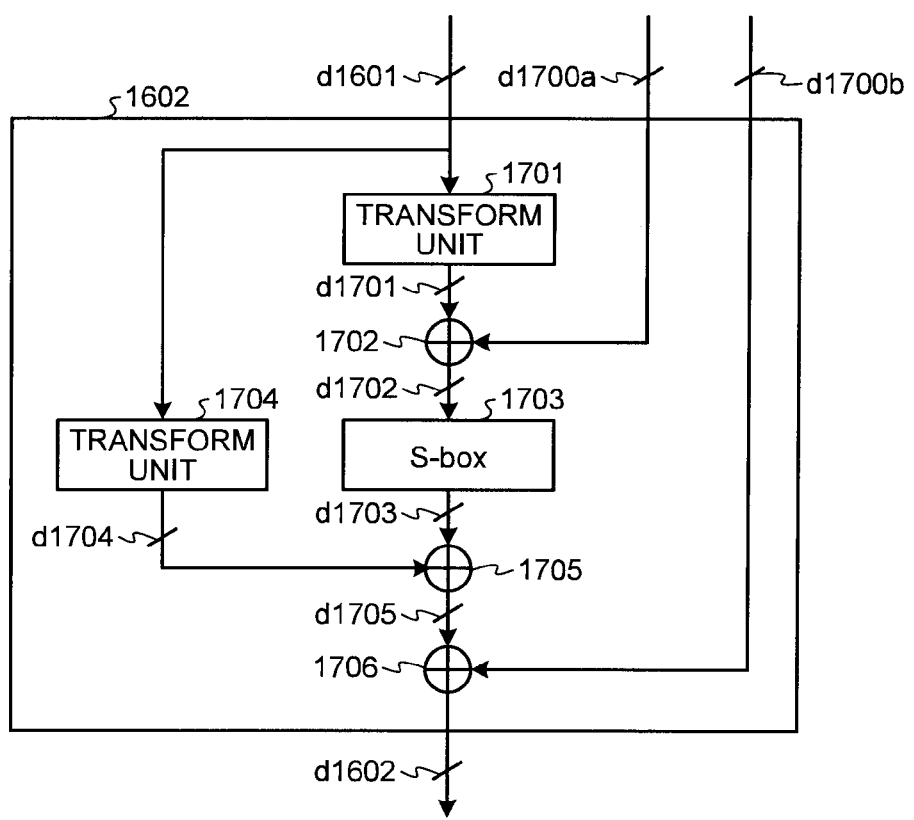
FIG. 16 is a block diagram showing a configuration example of a transform unit.

FIG. 16 is a block diagram showing a configuration example of the transform unit 1602. The transform unit 1602 includes a transform unit 1701, an exclusive OR operation unit 1702, a transform unit 1704, an S-box 1703, an exclusive OR operation unit 1705, and an exclusive OR operation unit 1706.

The transform unit 1602 receives data d1601, d1700*a*, and d1700*b*, and inputs data d1601 to the transform unit 1701. The transform unit 1602 calculates data d1702 which is the exclusive OR of data d1701 output from the transform unit 1701 and data d1700*a* and inputs data d1702 to the S-box 1703. The transform unit 1602 transforms data d1601 to data d1704 in the transform unit 1704. The transform unit 1602 calculates data d1705 which is the exclusive OR of data d1703 output from the S-box 1703 and data d1704 output from the transform unit 1704. The transform unit 1602 calculates and outputs data d1602 which is the exclusive OR of data d1705 and d1700*b*.

Data d1700*a* is one of sixteen pieces of data which are obtained by segmenting the 128-bit input mask d120*b* output from the mask generation unit 105 in terms of eight bits. Data d1700*b* is one of sixteen pieces of data which are obtained by segmenting the 128-bit output mask d121*b* output from the mask generation unit 105 in terms of eight bits.

The transform unit 1701 outputs the result d1701 of exclusive OR of the result, which is obtained by transforming the result of the exclusive OR of input data d1601 and transforming data d1601*b* by the inverse function φ$^{-1}$ of the function φ, and transforming data d1601*a*.

The S-box 1703 is the same nonlinear transform as the S-box of AES, and transforms input data d1702 to d1703. The transform unit 1704 is the same transform as the transform unit 1603, and transforms input data d1601 to d1704. When input data d1601 is in a range of 0 to 255, the transform unit 1602 may calculate output data d1602 in advance and may hold data d1602 as a transform table. In this case, the transform unit 1602 receives data d1601 and outputs data d1602 corresponding to received data d1601 with reference to the transform table.

If S-box transform is denoted by S, input/output data of the MES 1600 satisfies the relationship of the following expression (7).

$$d1602\char`\^d1603\char`\^d1700b = S(d1600l\char`\^d1600r\char`\^d1700a) \quad (7)$$

Although a configuration example has heretofore been described where 128-bit data is processed by eight bits, the processing unit is not limited to eight bits, and may be 16 bits or 128 bits. A different number of bits may be used as the units of processing. The MESs 1600 to 1615 provided in the Sub-Byte processing unit 112*b* may have the same configuration.

Fourth Embodiment

Figure 17:
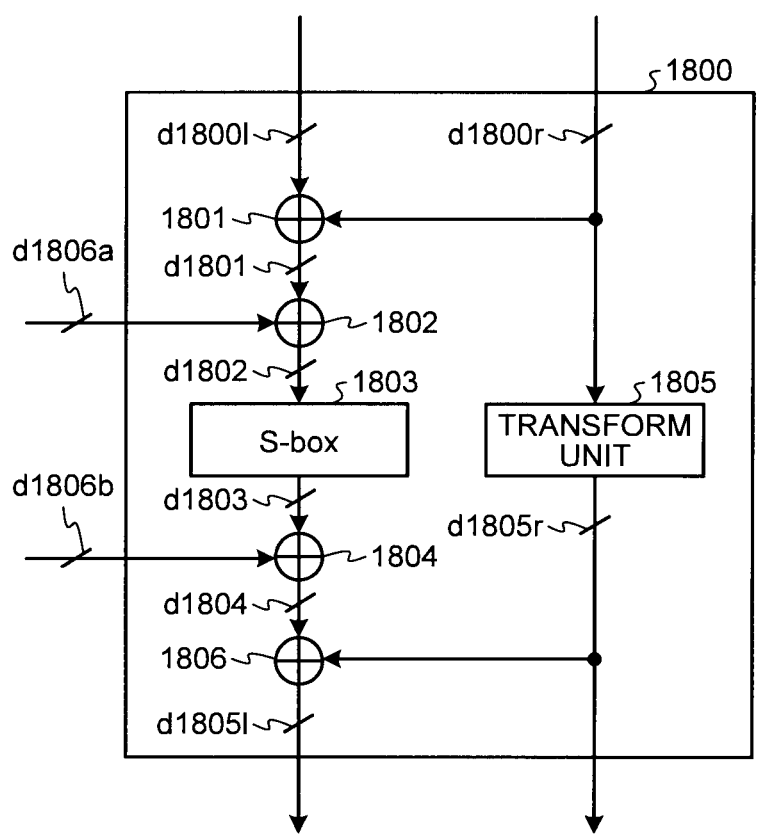
FIG. 17 is a block diagram showing a configuration example of an MES of a fourth embodiment.

A fourth embodiment is different from the first embodiment in that, in place of the MESs 2200 to 2215, MESs 1800 are provided. FIG. 17 is a block diagram showing a configuration example of the MES 1800. The MES 1801 to the MES 1815 have the same configuration as the MES 1800, thus description thereof will be omitted.

The MES 1800 includes an exclusive OR operation unit 1801, an exclusive OR operation unit 1802, an exclusive OR operation unit 1804, an exclusive OR operation unit 1806, an S-box 1803 which is defined by an encryption algorithm, and a transform unit 1805.

The MES 1800 receives data d1800*l* and data d1800*r*, which are segmented data of masked data under the encryption processing, and data d1806*a* and data d1806*b*. The MES 1800 calculates data d1801 which is the exclusive OR of data d1800*l* and data d1800*r*. The MES 1800 calculates data d1802 which is the exclusive OR of data d1801 and data d1806*a* and inputs data d1802 to the S-box 1803. The MES 1800 calculates data d1804 which is the exclusive OR of data d1803 output from the S-box 1803 and data d1806*b*. The MES 1800 inputs data d1800*r* to the transform unit 1805. The MES 1800 outputs data d1805*l* which is the exclusive OR of data d1805*r* output from the transform unit 1805 and data d1804.

The transform unit 1805 transforms data d1800*r* to data d1805*r* by using predetermined transform and outputs data d1805*r*. The transform unit 1805 may be nonlinear transform, such as S-box, linear function, such as the function φ described in the first embodiment, or arbitrary transform.

The MES 1800 may calculate output data for input data in advance and hold output data as a transform table. In this case, the MES 1800 receives input data d1800*l* and data d1800*r*, and outputs data d1805*l* and data d1805*r* with reference to the transform table.

If S-box transform is denoted by S, input/output data of the MES 1800 satisfies the relationship of the following expression (8).

$$d1805l\char`\^d1805r\char`\^d1806b = S(d1800l\char`\^d1800r\char`\^d1806a) \quad (8)$$

Although a configuration example has heretofore been described where 128-bit data is processed by eight bits, the unit of processing is not limited to eight bits, and may be 16 bits or 128 bits. A different number of bits may be used as the units of processing. The MESs 1800 to 1815 provided in the SubByte processing unit 112b may have the same configuration.

Fifth Embodiment

Figure 18:
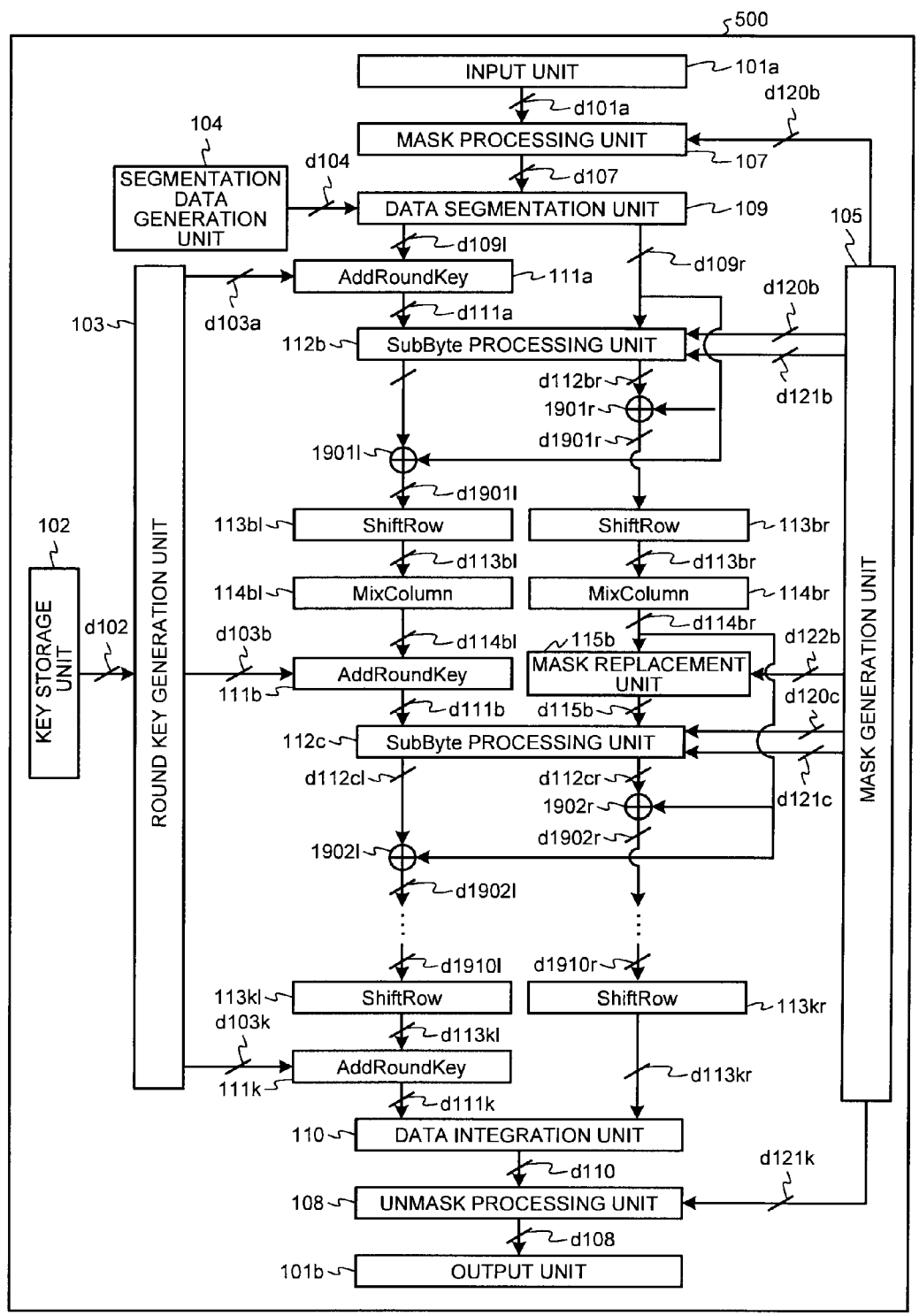
FIG. 18 is a block diagram showing a configuration example of an encryption device of a fifth embodiment.

FIG. 18 is a block diagram showing a configuration example of an encryption device 500 according to a fifth embodiment. The same processing units and data as those in FIG. 3 which is a block diagram of the encryption device 100 of the first embodiment are represented by the same reference numerals as in FIG. 3, and description thereof will be omitted.

The encryption device 500 further includes exclusive OR operation units 1901l to 1910l and 1901r to 1910r.

The exclusive OR operation unit 1901l inputs data d1901l, which is the result of exclusive OR of data d109r output from the data segmentation unit 109 and data d112bl output from the SubByte processing unit 112b, to the ShiftRow 113bl.

The exclusive OR operation unit 1901r inputs data d1901r, which is the result of exclusive OR of data d109r output from the data segmentation unit 109 and data d112br output from the SubByte processing unit 112b, to the ShiftRow 113br.

The exclusive OR operation unit 1901l may input data d1901l, which is the result of exclusive OR of data d109l output from the data segmentation unit 109 and data d112bl output from the SubByte processing unit 112b, to the ShiftRow 113bl.

At this time, the exclusive OR operation unit 1901r inputs data d1901r, which is the result of exclusive OR of data d109l output from the data segmentation unit 109 and data d112br output from the SubByte processing unit 112b, to the ShiftRow 113br.

The exclusive OR operation unit 1901l may input data d1901l, which is the result of exclusive OR of data d109l or data d109r output from the data segmentation unit 109 and data d113bl output from the ShiftRow 113bl, to the MixColumn 114bl.

The exclusive OR operation unit 1901r may input data d1901r, which is the result of exclusive OR of data d109l or d109r output from the data segmentation unit 109 and data d113br output from the ShiftRow 113br, to the MixColumn 114br.

The exclusive OR operation units 1902l to 1910l respectively input data d1902l to d1910l, which are the results of exclusive OR of data d114bl to d114jl output from the MixColumn 114bl to 114jl or data d114br to d114jr output from the MixColumn 114br to 114jr and data d112cl to d112kl output from the SubByte processing unit 112c to 112k, to the ShiftRow 113cl to 113kl.

The exclusive OR operation units 1902r to 1910r respectively input data d1902r to d1910r, which are the results of exclusive OR of data d114bl to d114jl output from the MixColumn 114bl to 114jl or data d114br to d114jr output from the MixColumn 114br to 114jr and the data d112cr to d112kr output from the SubByte processing unit 112c to 112k, to the ShiftRow 113cr to 113kr.

The exclusive OR operation units 1902l to 1910l may respectively input data d1902l to d1910l, which are the results of exclusive ORs of data d114bl to d114jl output from the MixColumn 114bl to 114jl or data d114br to d114jr output from the MixColumn 114br to 114jr and data d113cl to d113kl output from the ShiftRow 113cl to 113kl, to the MixColumn 114cl to 114jl and the AddRoundKey 111k.

The exclusive OR operation unit 1902r to 1910r may respectively input data d1902r to d1910r, which are the results of exclusive OR of data d114bl to d114jl output from the MixColumn 114bl to 114jl or data d114br to d114jr output from the MixColumn 114br to 114jr and data d113cr to d113kr output from the ShiftRow 113cr to 113kr, to the MixColumn 114cr to 114jr and the data integration unit 110.

Sixth Embodiment

Figure 19:
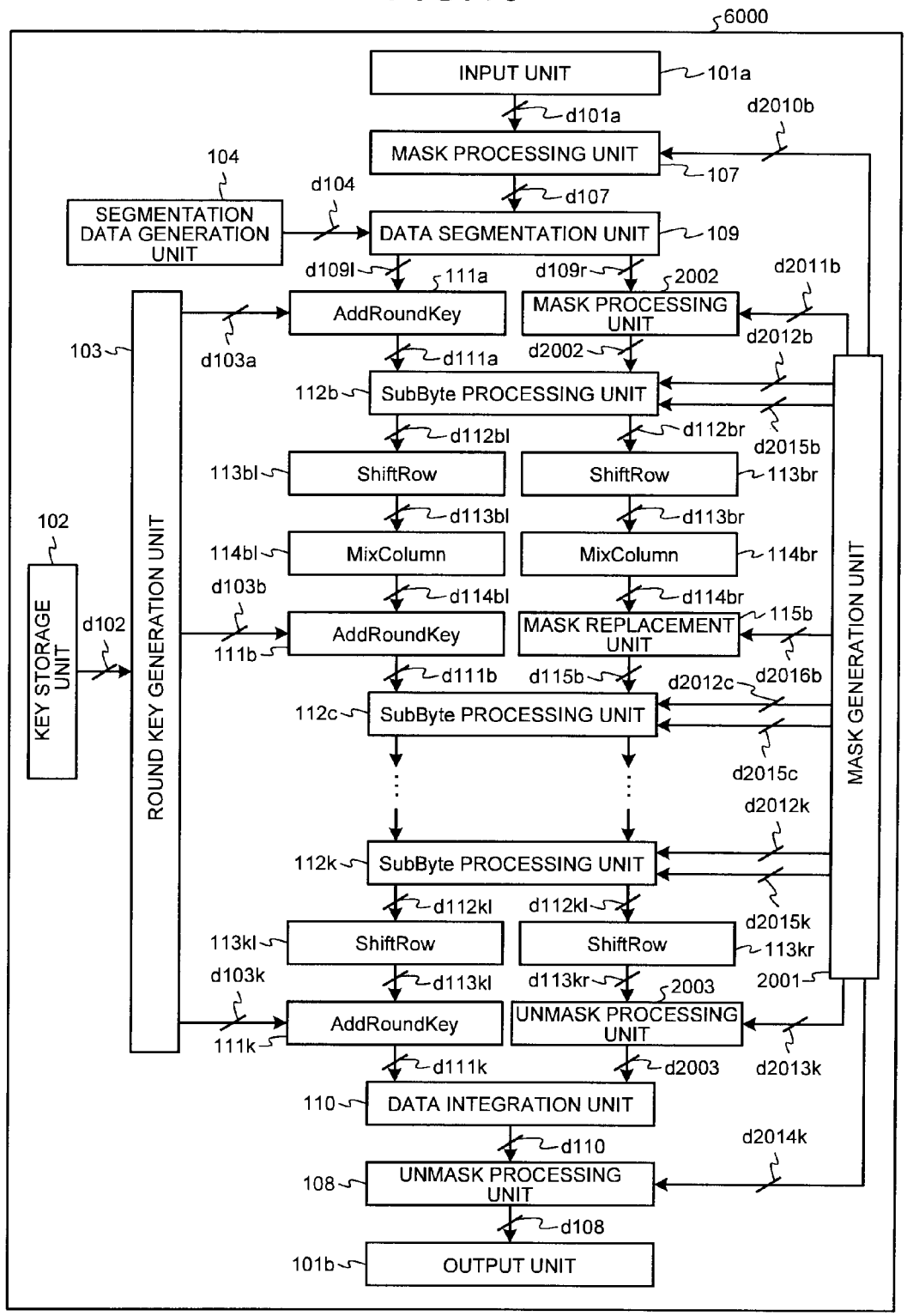
FIG. 19 is a block diagram showing a configuration example of an encryption device of a sixth embodiment.

FIG. 19 is a block diagram showing a configuration example of an encryption device 6000 according to a sixth embodiment. The same processing units and data as those in FIG. 3 which is a block diagram of the encryption device 100 of the first embodiment are represented by the same reference numerals as in FIG. 3, and description thereof will be omitted.

The encryption device 6000 includes a mask generation unit 2001, and further includes a mask processing unit 2002 and an unmask processing unit 2003.

The mask generation unit 2001 generates input masks d2012b to d2012k, segmented data d2010b to d2010k of the input masks, and segmented data d2011b to d2011k of the input masks. The input masks d2012b to d2012k are the exclusive OR result of segmented data d2010b to d2010k and d2011b to d2011k of the input masks.

The mask generation unit 2001 generates output masks d2015b to d2015k, segmented data d2013b to d2013k of the output masks, and segmented data d2014b to d2014k of the output masks. The output masks d2015b to d2015k are the exclusive OR result of segmented data d2013b to d2013k and d2014b to d2014k of the output masks.

The mask generation unit 2001 generates replacement masks d2016b to d2016j. The replacement masks d2016b to d2016j are the result of exclusive OR of the input masks d2012c to d2012k and the output masks d2015b to d2015j.

The mask generation unit 2001 supplies segmented data d2010b of the input mask to the mask processing unit 107, supplies segmented data d2011b of the input mask to the mask processing unit 2002, and supplies the input masks d2012b to d2012k to the SubByte processing units 112b to 112k.

The mask generation unit 2001 may supply data having connected segmented data d2010b to d2010k and d2011b to d2011k of the input masks to the SubByte processing units 112b to 112k as the input masks d2012b to d2012k.

The mask generation unit 2001 supplies segmented data d2013k of the output mask to the unmask processing unit 2003, supplies segmented data d2014k of the output mask to the unmask processing unit 108, and supplies the output masks d2015b to d2015k to the SubByte processing unit 112b to 112k.

The mask generation unit 2001 may supply data having connected segmented data d2013b to d2013k and d2014b to d2014k of the output masks to the SubByte processing unit 112b to 112k as the output masks d2015b to d2015k.

The mask generation unit 2001 respectively supplies the replacement masks d2016b to d2016j to the mask replacement units 115b to 115j. The mask generation unit 2001 may supply data having connected segmented data d2010c to d2010k and d2011c to d2011k of the input masks and segmented data d2013b to d2013j and d2014b to d2014j of the output masks as the replacement masks d2016b to d2016j.

The mask processing unit 2002 inputs the result d2002 of exclusive OR of data d109r output from the data segmentation unit 109 and segmented data d2011b of the input mask to the SubByte processing unit 112b.

The mask processing unit 2002 may input result d2002 of exclusive OR of data d109l output from the data segmentation unit 109 and segmented data d2011b of the input mask to the AddRoundKey 111a.

The mask processing unit 2002 may input the result d2002 of exclusive OR of data d107 output from the mask processing unit 107 and segmented data d2011 of the input mask to the data segmentation unit 109.

The unmask processing unit 2003 inputs the result d2003 of exclusive OR of data d113*kr* output from the ShiftRow 113*kr* and segmented data d2013*k* of the output mask to the data integration unit 110.

The unmask processing unit 2003 may input the result d2003 of exclusive OR of data d111*k* output from the AddRoundKey 111*k* and segmented data d2013*k* of the output mask to the data integration unit 110.

The unmask processing unit 2003 may input the result d2003 of exclusive OR of data d110 output from the data integration unit 110 and segmented data d2013*k* of the output mask to the unmask processing unit 108.

In the SubByte processing unit 112*b*, if S-box transform is denoted by S, and the result of exclusive OR of two pieces of input data of the SubByte processing unit 112*b* is denoted by d2020*b*, input/output data of the SubByte processing unit 112*b* satisfies the relationship of the following expression (9)

$$d112bl\hat{\ }d112br\hat{\ }d2015b=S(d2020b\hat{\ }d2012b) \quad (9)$$

If the expression (9) is satisfied, the above-described calculation procedure may not be provided.

As described above, when the mask generation unit 2001 supplies segmented data d2010*b* and d2011*b* of the input mask to the SubByte processing unit 112*b*, input/output data of the SubByte processing unit 112*b* satisfies the relationship of the following expression (10).

$$d112bl\hat{\ }d112br\hat{\ }d2015b=S(d2020b\hat{\ }d2012b)=S(d2020b\hat{\ }d2010b\hat{\ }d2011b) \quad (10)$$

If the expression (10) is satisfied, the above-described calculation procedure may not be provided.

Similarly, when the mask generation unit 2001 supplies segmented data d2013*b* and d2014*b* of the output mask to the SubByte processing unit 112*b*, input/output data of the SubByte processing unit 112*b* satisfies the relationship of the following expression (11).

$$d112bl\hat{\ }d112br\hat{\ }d2015b=d112bl\hat{\ }d112br\hat{\ }d2013b\hat{\ }d2014b=S(d2020b\hat{\ }d2012b) \quad (11)$$

If the expression (11) is satisfied, the above-described calculation procedure may not be provided. The same relationship is established for the SubByte processing units 112*c* to 112*k*.

When the mask generation unit 2001 supplies segmented data d2010*c* and d2011*c* of the input mask and segmented data d2013*b* and d2014*b* of the output mask to the mask replacement unit 115*b*, input/output data of the mask replacement unit 115*b* satisfies the relationship of the following expression (12).

$$d115b=d114br\hat{\ }d2010c\hat{\ }d2011c\hat{\ }d2013b\hat{\ }d2014b \quad (12)$$

If the expression (12) is satisfied, the above-described calculation procedure may not be provided. The same relationship is established for the mask replacement units 115*c* to 115*j*.

As described above, according to the first to sixth embodiments, it is possible to provide an encryption device having resistance against power analysis including high-order DPA with an encryption module using nonlinear transform. That is, according to the above-described embodiments, the MES receives a plurality of pieces of data obtained by segmenting masked intermediate data of the encryption processing and performs nonlinear transform in a state of being masked, thereby outputting a plurality of data obtained by segmenting the correct nonlinear transform result. Thus, the correlation between intermediate data of the encryption processing and power consumption is eliminated, and there is resistance against power analysis. When one type of MES is used in single encryption processing, there is resistance for a countermeasure against secondary DPA, and it becomes possible to reduce the circuit size, storage capacity, processing time, and power consumption, compared to a random mask method as a related-art technique against secondary DPA.

Figure 20:
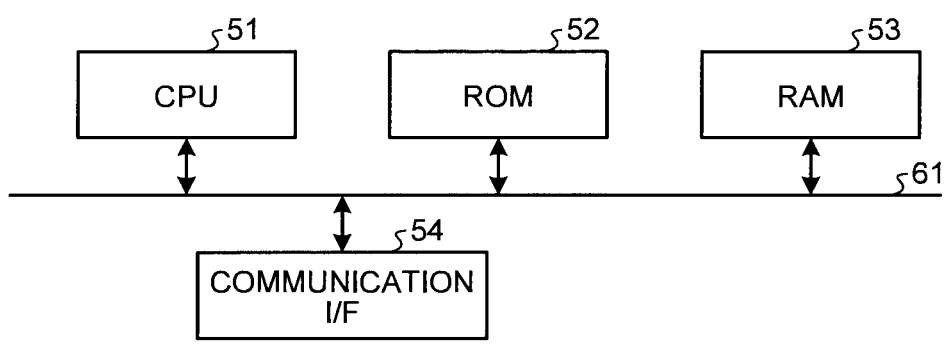
FIG. 20 is an explanatory view showing the hardware configuration of an encryption device according to each of the first to sixth embodiments.

Next, the hardware configuration of the encryption device according to each of the first to sixth embodiments will be described with reference to FIG. 20. FIG. 20 is an explanatory view showing the hardware configuration of the encryption device according to each of the first to sixth embodiments.

The encryption device according to each of the first to sixth embodiments includes a control device, such as a Central Processing Unit (CPU) 51, a storage device, such as a Read Only Memory (ROM) 52 or a Random Access Memory (RAM) 53, a communication I/F 54 which is connected to a network and performs communication, an external storage device, such as a Hard Disk Drive (HDD) or a Compact Disc (CD) drive device, a display device, such as a display device, an input device, such as a keyboard or a mouse, and a bus 61 which connects the respective units. The encryption device has the hardware configuration using a typical computer.

A program which is executed in the encryption device according to each of the first to sixth embodiments is recorded in a computer-readable recording medium, such as a Compact Disk Read Only Memory (CD-ROM), a flexible disk (FD), a Compact Disk Recordable (CD-R), or a Digital Versatile Disk (DVD), in an installable or executable format and is provided as a computer program product.

The program which is executed in the encryption device according to each of the first to sixth embodiments may be stored in a computer which is connected to a network, such as the Internet, and may be downloaded through the network. The program which is executed in the encryption device according to each of the first to sixth embodiments may be provided or distributed through a network, such as the Internet.

The program of each of the first to sixth embodiments may be incorporated into a ROM or the like and provided.

The image processing program which is executed in the image processing apparatus according to each of the first to fourth embodiments may be configured as a module including the above-described units. As actual hardware, the CPU 51 (processor) reads the image processing program from the storage device and executes the image processing program, such that the above-described units are loaded and generated on a main storage device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An encryption device which performs encryption processing for encrypting plain data to encrypted data, the encryption processing including nonlinear transform processing, the encryption device comprising:

a mask processing unit which calculates masked plain data on the basis of the plain data and a first mask;

a segmentation unit which segments the masked plain data into a plurality of pieces of first segmented data;

a first processing unit which performs predetermined first processing on the plurality of pieces of first segmented data to generate a plurality of pieces of second segmented data;

a nonlinear transform unit which generates a plurality of pieces of third segmented data transformed from the plurality of pieces of second segmented data;

a second processing unit which performs predetermined second processing on the plurality of pieces of third segmented data to generate a plurality of pieces of fourth segmented data;

a data integration unit which integrates the plurality of pieces of fourth segmented data to generate masked encrypted data; and an unmask processing unit which generates the encrypted data on the basis of the masked encrypted data and a second mask, wherein the exclusive OR of the plurality of pieces of second segmented data matches the exclusive OR of input data, which is to be subjected to the nonlinear transform processing and is calculated from the plain data, and the first mask, and wherein the exclusive OR of the plurality of pieces of third segmented data matches the exclusive OR of transform data, which is obtainable when the nonlinear transform processing is performed on the input data, and the second mask.

2. The encryption device according to claim 1, wherein the nonlinear transform unit includes:

a plurality of first transform units which are provided to correspond to the plurality of pieces of second segmented data and generates data transformed from the corresponding second segmented data by transform processing including linear transform;

a second transform unit which generates data nonlinearly transformed from the exclusive OR of the pieces of data generated by the plurality of first transform units as one of the plurality of pieces of third segmented data; and a third transform unit which generates data transformed from the exclusive OR of the pieces of data linearly transformed by the plurality of first transform units through predetermined transform processing as one of the plurality of pieces of third segmented data.

3. The encryption device according to claim 1, wherein the second processing unit includes a linear transform unit which linearly transform the plurality of pieces of third segmented data.

4. The encryption device according to claim 1, further comprising:

a random number generation unit which generates a first random number and a second random number, wherein the mask processing unit calculates the masked plain data by masking the plain data with the first random number serving as the first mask, and wherein the unmask processing unit generates the encrypted data on the basis of the second random number serving as the second mask.

* * * * *